(12) United States Patent
Asai

(10) Patent No.: US 8,256,321 B2
(45) Date of Patent: Sep. 4, 2012

(54) FLEXIBLE ACTUATOR AND JOINT-DRIVING UNIT USING THE SAME

(75) Inventor: Katsuhiko Asai, Nara (JP)

(73) Assignee: Panasonic Corporation, Osaka (JP)

( * ) Notice: Subject to any disclaimer, the term of this patent is extended or adjusted under 35 U.S.C. 154(b) by 142 days.

(21) Appl. No.: 12/962,799

(22) Filed: Dec. 8, 2010

(65) Prior Publication Data

US 2011/0072919 A1 Mar. 31, 2011

Related U.S. Application Data

(62) Division of application No. 12/529,734, filed as application No. PCT/JP2009/000225 on Jan. 22, 2009, now Pat. No. 7,870,808.

(30) Foreign Application Priority Data

Jan. 28, 2008 (JP) .................. 2008-016437

(51) Int. Cl.
*B25J 17/00* (2006.01)
*B25J 17/02* (2006.01)
*B25J 18/00* (2006.01)

(52) U.S. Cl. .......... 74/490.06; 74/490.01; 901/27; 901/29

(58) Field of Classification Search ........ 74/490.01, 74/490.05, 490.06; 901/15, 19, 27, 29
See application file for complete search history.

(56) References Cited

U.S. PATENT DOCUMENTS

| 5,650,704 | A | 7/1997 | Pratt et al. |
|---|---|---|---|
| 5,910,720 | A | 6/1999 | Williamson et al. |
| 6,699,235 | B2 | 3/2004 | Wallace et al. |
| 7,066,926 | B2 | 6/2006 | Wallace et al. |
| 7,555,969 | B2 | 7/2009 | Okazaki |
| 2007/0199399 | A1 | 8/2007 | Okazaki et al. |
| 2010/0170241 | A1 | 7/2010 | Asai |

FOREIGN PATENT DOCUMENTS

JP 11-141643 5/1999

OTHER PUBLICATIONS

International Search Report issued Feb. 24, 2009 in International (PCT) Application No. PCT/JP2009/000225.
M. Zinn et al., "A new Actuation Concept for Human-Friendly Robot Design", IEEE Robotics & Automation Magazine, vol. 11, Issue 2, Jun. 2004, pp. 12-21.
A. Bicchi et al., "Dealing with the Safety-Performance Tradeoff in Robot Arms Design and Control", IEEE Robotics & Automation Magazine, vol. 11, Issue 2, Jun. 2004, pp. 22-33.
International Preliminary Report on Patentability and Written Opinion of the International Searching Authority, issued Aug. 31, 2010 in PCT/JP2009/000225, including Forms PCT/IB/338, PCT/IB/373 and PCT/ISA/237 (in English).

*Primary Examiner* — Justin Krause
(74) *Attorney, Agent, or Firm* — Wenderoth, Lind & Ponack, LLP.

(57) ABSTRACT

A displacement member can be displaced in a direction substantially perpendicular to a moving direction of a translation member that is held on a base member so as to reciprocatingly move thereon linearly, and an elastic mechanism secured to the base member accumulates and releases elastic energy in accordance with the distance to the displacement member. Protruding members of the translation member are pressed against a transmission member by generated force provided by the energy release from the elastic mechanism; thus, a distance adjusting operation between coupling mechanisms coupling the transmission member and the displacement member is controlled by a control device so that the relative position and relative angle between the displacement member and the transmission member are changed.

7 Claims, 16 Drawing Sheets

US 8,256,321 B2

FLEXIBLE ACTUATOR AND JOINT-DRIVING UNIT USING THE SAME

This application is a Divisional of U.S. application Ser. No. 12/529,734, filed Sep. 3, 2009 now U.S. Pat. No. 7,870,808, which is a national stage application of International application No. PCT/JP2009/000225, filed Jan. 22, 2009.

TECHNICAL FIELD

The present invention relates to a flexible actuator with which force control is easily carried out with superior operation efficiency, and a joint-driving unit using the actuator.

BACKGROUND ART

In recent years, there are high expectations for robots that are operated within areas close to people, such as robots for medical applications, domestic robots, and work support robots for use in factories. Unlike industrial robots, it is important for these robots to ensure safety when the robots are in contact with a person. In order to reduce impact upon contact, for the necessity to reduce a force to act on the contact point, the torque in the joint needs to be controlled to provide a flexible joint when viewed from the robot arm side. However, in the force (torque) control using an actuator for driving the joint, it is not possible to increase the response frequency infinitely, and in the case where force in a high-frequency range is exerted, such as in the case where a robot arm collides with a person, it is not possible to deal with the force. Normally, a combination of a motor and a speed reducer is used for joint driving, and when viewed from the robot arm side, the inertia is represented by a value obtained by multiplying the inertia inherent to the motor by the square of the reduction ratio. For this reason, in a state where force control is not effective, extremely large force acts on the contact point, with the result that it is not possible to sufficiently ensure safety by using only the force control.

In view of these issues, a system has been proposed in which an actuator and a load are connected to each other through an elastic member referred to as "Series elastic actuators (SEA)" (for example, see Patent Document 1). The SEA makes it possible to suppress even force in a high-frequency range that cannot be controlled by actuators, by utilizing flexibility of the elastic member, and also provides a flexible actuator that can achieve a flexible joint at all times when viewed from the arm side, so that it becomes possible to ensure higher safety. On the other hand, since the SEA is connected to a load through an elastic member, its controllable frequency bands are lowered in comparison with a conventional device. In order to compensate for these disadvantages, there has been proposed another system, such as a system referred to as "Distributed macro-mini actuation (DM2)" that is additionally provided with an actuator for high frequencies (for example, see Non-Patent Document 1), or a system referred to as "Variable Stiffness Transmission (VST)" in which the rigidity of the elastic member is variably controlled (for example, see Non-Patent Document 2).

Patent Document 1: U.S. Pat. No. 5,650,704
Non-Patent Document 1: IEEE Robotics & Automation Magazine, Volume 11, Issue 2, pages 12 to 21
Non-Patent Document 2: IEEE Robotics & Automation Magazine, Volume 11, Issue 2, pages 22 to 33

DISCLOSURE OF INVENTION

Subject to be Solved by the Invention

In the above-mentioned flexible actuators, such as SEA, DM2, and VST, in an attempt to greatly reduce influences of the inertia on the motor side relative to an input from the robot arm side, the robot arm and the motor are connected to each other through an elastic member. From the opposite point of view, this system fails to transmit energy inputted from the robot arm side directly to the motor side, making it difficult to electrically regenerate the energy. In the case of a robot that is operated within an area close to people, there are many opportunities in which a work is done from the outside of the flexible actuator, such as in a cooperative operation with a person or in an operation for bringing an object down. However, in the case of a conventional flexible actuator that fails to regenerate energy, even in a state where a work is done from the outside of the flexible actuator, energy is consumed on the actuator side to cause an issue that the efficiency is greatly lowered throughout the entire operation.

In view of these issues, an object of the present invention is to provide a flexible actuator with which force control is easily carried out with superior operation efficiency, and a joint-driving unit using the actuator.

Means for Solving the Subject

In order to achieve the above-mentioned object, the present invention has the following arrangement.

According to a first aspect of the present invention, there is provided a flexible actuator capable of carrying out a translation operation, comprising:

a base member;

a translation member that is held on the base member so as to move reciprocatingly thereon linearly;

a displacement member that is capable of being displaced in a direction substantially perpendicular to a moving direction of the translation member;

an elastic mechanism that is secured to the base member, for accumulating and releasing elastic energy in accordance with a distance to the displacement member;

a transmission member that is connected to the displacement member so as to allow the distance relative to the displacement member to be adjusted by two or more coupling mechanisms;

a protruding member that is formed on the translation member in a protruding manner to be pressed against the transmission member by force generated by energy released from the elastic mechanism; and a control device for changing a relative position and a relative angle between the displacement member and the transmission member by controlling an adjusting operation of the distance relative to the coupling mechanisms.

According to a second aspect of the present invention, there is provided a flexible actuator capable of carrying out a swinging operation and a rotating operation, comprising:

a base member;

a rotating member that is held on the base member so as to rotate freely thereon;

a displacement member that is capable of being displaced in a direction that is substantially same as a rotation shaft direction of the rotating member;

an elastic mechanism that is secured to the base member, for accumulating and releasing elastic energy in accordance with a distance to the displacement member;

a transmission member that is connected to the displacement member so as to allow the distance relative to the displacement member to be adjusted by three or more coupling mechanisms;

a protruding member that is provided on the rotating member at a position off a rotation center of the rotating member in a protruding manner to be pressed against the transmission member by force generated by energy released from the elastic mechanism; and a control device for changing a relative position and a relative angle between the displacement member and the transmission member by controlling an adjusting operation of the distance relative to the coupling mechanisms.

In accordance with a ninth aspect of the present invention, a joint-driving unit that is driven by the flexible actuator defined in any one of the first to eighth aspects is provided.

Effects of the Invention

In accordance with the present invention, it is possible to obtain the flexible actuator that is superior in operation efficiency and the joint-driving unit using the actuator. That is, in accordance with the present invention, the force generated through the energy release from the elastic mechanism is outputted to the translation member at a speed variably changed in response to the amount of inclination of the transmission member, so that force control can be easily carried out by controlling the amount of inclination of the transmission member, and it is possible to obtain the flexible actuator with which even upon application of force in a high-frequency range, the generated force is regulated by the elasticity of the elastic mechanism, and the present invention also provides the joint-driving unit using the actuator. Further, the displacement of the translation member varies in cooperation with the displacement of the elastic mechanism; therefore, when a work is done from the outside of the actuator, the energy inputted to the actuator is accumulated in the elastic mechanism, so that it is possible to improve the operation efficiency.

BRIEF DESCRIPTION OF DRAWINGS

These and other aspects and features of the present invention will become clear from the following description taken in conjunction with the preferred embodiments thereof with reference to the accompanying drawings, in which.

BEST MODE FOR CARRYING OUT THE INVENTION

Figure 1A:
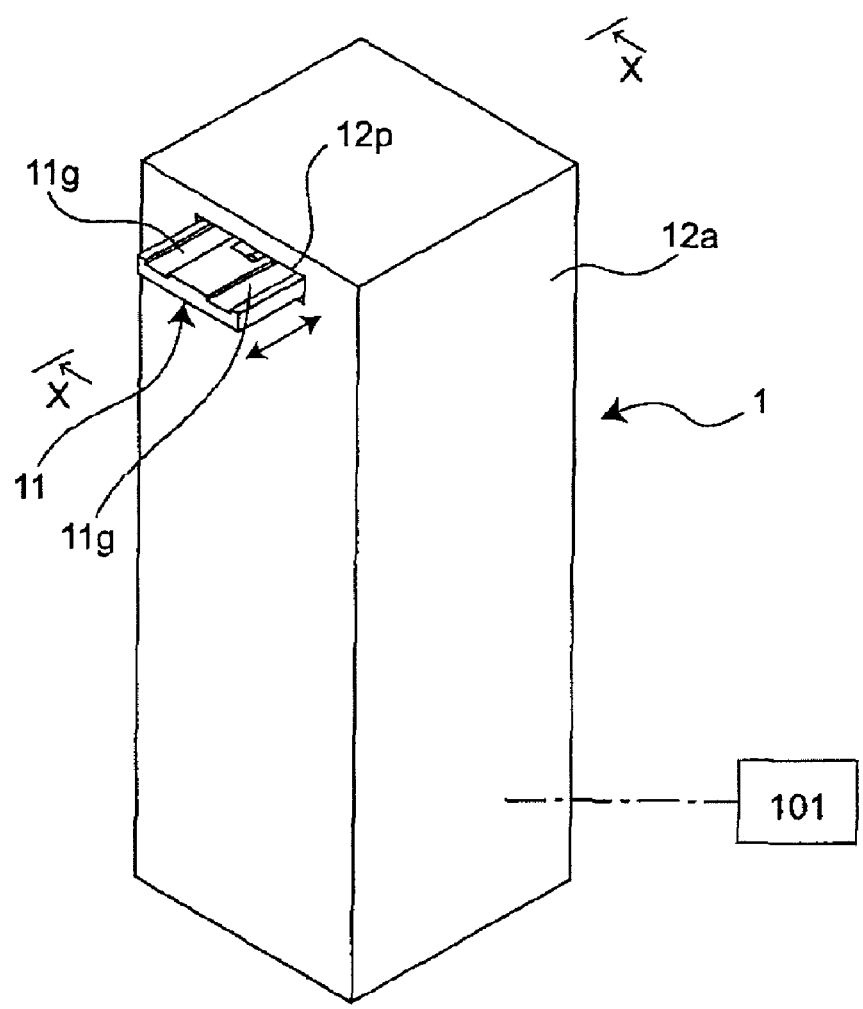
FIG. 1A is a perspective view schematically showing a translation actuator in accordance with a first embodiment of the present invention.

Embodiments in accordance with the present invention will be described below in detail with reference to the drawings.

Prior to the detailed description of the embodiments of the present invention with reference to the drawings, various modes of the present invention will be described below.

According to a first aspect of the present invention, there is provided a flexible actuator capable of carrying out a translation operation, comprising:

a base member;

a translation member that is held on the base member so as to move reciprocatingly thereon linearly;

a displacement member that is capable of being displaced in a direction substantially perpendicular to a moving direction of the translation member;

an elastic mechanism that is secured to the base member, for accumulating and releasing elastic energy in accordance with a distance to the displacement member;

a transmission member that is connected to the displacement member so as to allow the distance relative to the displacement member to be adjusted by two or more coupling mechanisms;

a protruding member that is formed on the translation member in a protruding manner to be pressed against the transmission member by force generated by energy released from the elastic mechanism; and a control device for changing a relative position and a relative angle between the displacement member and the transmission member by controlling an adjusting operation of the distance relative to the coupling mechanisms.

In accordance with this arrangement, since the generated force in the elastic mechanism is outputted to the translation member at a speed variably changed in accordance with the amount of inclination of the transmission member, force control can be easily carried out by controlling the amount of inclination of the transmission member, and it is possible to obtain the flexible actuator with which, even upon application of force in a high-frequency range, the generated force is regulated by the elasticity of the elastic mechanism. Further, the displacement of the translation member varies in cooperation with the displacement of the elastic mechanism; therefore, when a work is done from the outside of the flexible actuator, the energy inputted to the actuator is accumulated in the elastic mechanism, so that it is possible to improve the operation efficiency. Therefore, the flexible actuator that is superior in operation efficiency can be obtained.

According to a second aspect of the present invention, there is provided a flexible actuator capable of carrying out a swinging operation and a rotating operation, comprising:

a base member;

a rotating member that is held on the base member so as to rotate freely thereon;

a displacement member that is capable of being displaced in a direction that is substantially same as a rotation shaft direction of the rotating member;

an elastic mechanism that is secured to the base member, for accumulating and releasing elastic energy in accordance with a distance to the displacement member;

a transmission member that is connected to the displacement member so as to allow the distance relative to the displacement member to be adjusted by three or more coupling mechanisms;

a protruding member that is provided on the rotating member at a position off a rotation center of the rotating member in a protruding manner to be pressed against the transmission member by force generated by energy released from the elastic mechanism; and a control device for changing a relative position and a relative angle between the displacement member and the transmission member by controlling an adjusting operation of the distance relative to the coupling mechanisms.

In accordance with this arrangement, since the generated force in the elastic mechanism is outputted to the rotating member at a speed variably changed in accordance with the amount of inclination of the transmission member, torque control can be easily carried out by controlling the amount of inclination of the transmission member, and it is possible to obtain the flexible actuator with which, even upon application of force in a high-frequency range, the generated force is regulated by the elasticity of the elastic mechanism. Further, the rotation of the rotating member occurs in conjunction with the displacement of the elastic mechanism; therefore, when a work is done from the outside of the flexible actuator, the energy inputted to the actuator is accumulated in the elastic mechanism, so that it is possible to improve the operation efficiency. Therefore, the flexible actuator that is superior in operation efficiency can be obtained.

According to a third aspect of the present invention, there is provided the flexible actuator according to the second aspect, wherein the coupling mechanisms are circumferentially disposed at equal intervals.

With this arrangement, variation in controllability due to angles of the rotating member can be minimized, and it is possible to provide the flexible actuator that is superior in controllability.

According to a fourth aspect of the present invention, there is provided the flexible actuator according to any one of the second to third aspects, wherein a contact point between the protruding member and the transmission member is located substantially on same plane as a side face of an elliptic column that includes a contact point between the coupling mechanisms and the transmission member or a rotation center of a coupling portion therebetween and has a height in a displacement direction of the displacement member.

With this arrangement, it is possible to reduce the amount of work of the coupling mechanisms required for inclining the transmission member in the radial direction of the rotating member, centered on the contact point between the protruding member and the transmission member. Therefore, the flexible actuator with higher operation efficiency can be obtained.

According to a fifth aspect of the present invention, there is provided the flexible actuator according to any one of the first to fourth aspects, wherein a contact point between the protruding member and the transmission member is located substantially on same plane as a side face of an elliptic column that includes a contact point between the coupling mechanisms and the transmission member or a rotation center of a coupling portion therebetween and has a height in a displacement direction of the displacement member.

With this arrangement, it is possible to reduce the amount of work of the coupling mechanisms required for inclining the transmission member in the moving direction of the protruding member, centered on the contact point between the protruding member and the transmission member. Therefore, the flexible actuator with higher operation efficiency can be obtained.

According to a sixth aspect of the present invention, there is provided the flexible actuator according to any one of the first to fifth aspects, wherein the elastic mechanism is a ram-type cylinder or a single rod cylinder that allows a fluid to move between pressure chambers on two sides of a piston.

With this arrangement, since changes in the generated force of the elastic mechanism due to changes in the distance to the displacement member are reduced, the flexible actuator with which force control is easily carried out can be obtained.

According to a seventh aspect of the present invention, there is provided the flexible actuator according to any one of the first to sixth aspects, wherein the coupling mechanisms have a structure with which the distance between the displacement member and the transmission member is adjustable substantially in parallel with a displacement direction of the displacement member and which is pressed against the transmission member by generated force of the elastic mechanism.

With this arrangement, since the hold of the coupling mechanisms are enhanced by taking into consideration only movements having one degree of freedom, hold with high rigidity becomes easily possible. Therefore, since unnecessary movements that give adverse effects on the controllability are reduced, it is possible to obtain the flexible actuator with which force control is easily carried out.

According to an eighth aspect of the present invention, there is provided the flexible actuator according to any one of the first to sixth aspects, wherein the coupling mechanisms are coupled to the displacement member and the transmission member respectively so as to rotate freely thereon, is variably adjustable a distance between both connecting points thereof.

With this arrangement, since the coupling mechanisms become able to generate not only force in an expanding direction but also force in a contracting direction relative to the transmission member, position and angle controls of the transmission member by using the expanding and contracting operations of the coupling mechanisms can be easily carried out. Therefore, it is possible to obtain the flexible actuator with which force control is more easily carried out.

In accordance with the ninth aspect of the present invention, there is provided a joint-driving unit that is driven by the flexible actuator defined in any one of the first to eighth aspects.

With this arrangement, since the joint-driving unit that is driven by the flexible actuator described in any one of the first to eighth aspects is constructed, it is possible to obtain the joint-driving unit that has the functions and effects of the above-mentioned flexible actuator.

Various embodiments of the present invention will be described below in detail with reference to the drawings.

FIRST EMBODIMENT

Figure 1B:
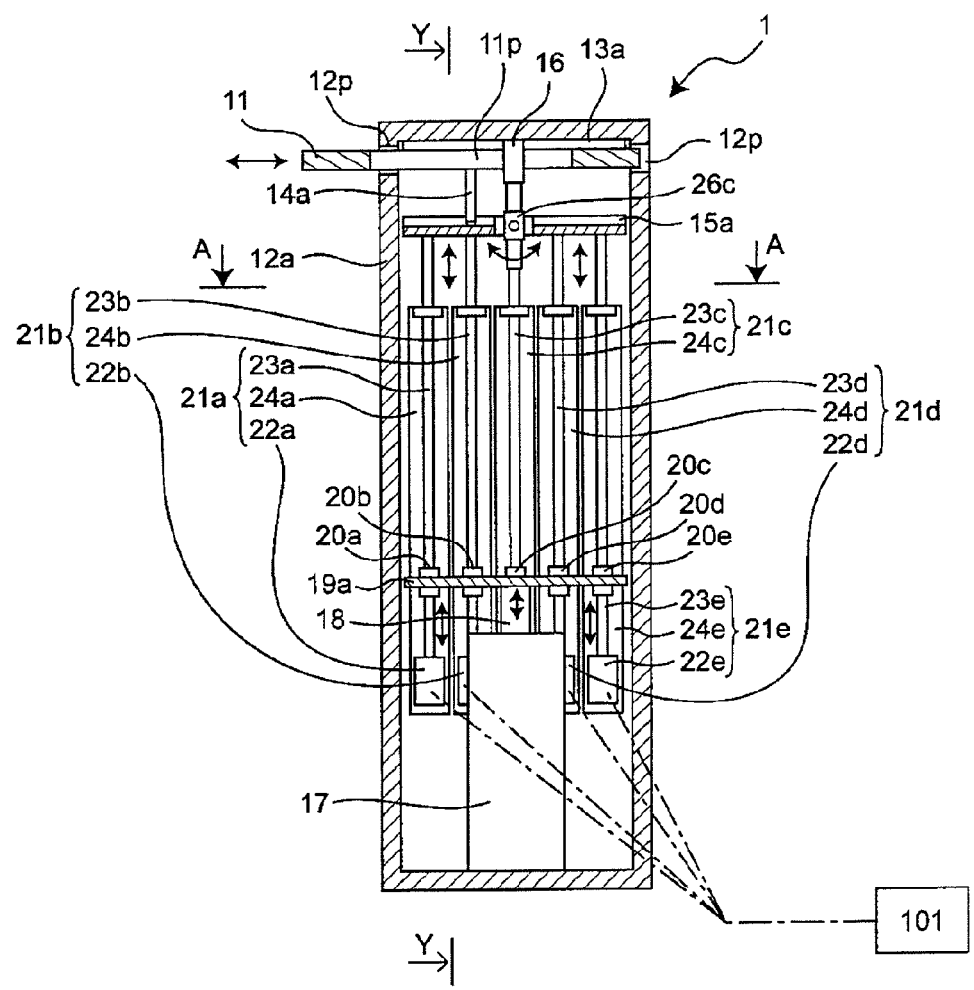
FIG. 1B is a cross-sectional view taken along line X-X of FIG. 1A, schematically showing the translation actuator in accordance with the first embodiment of the present invention.
Figure 1C:
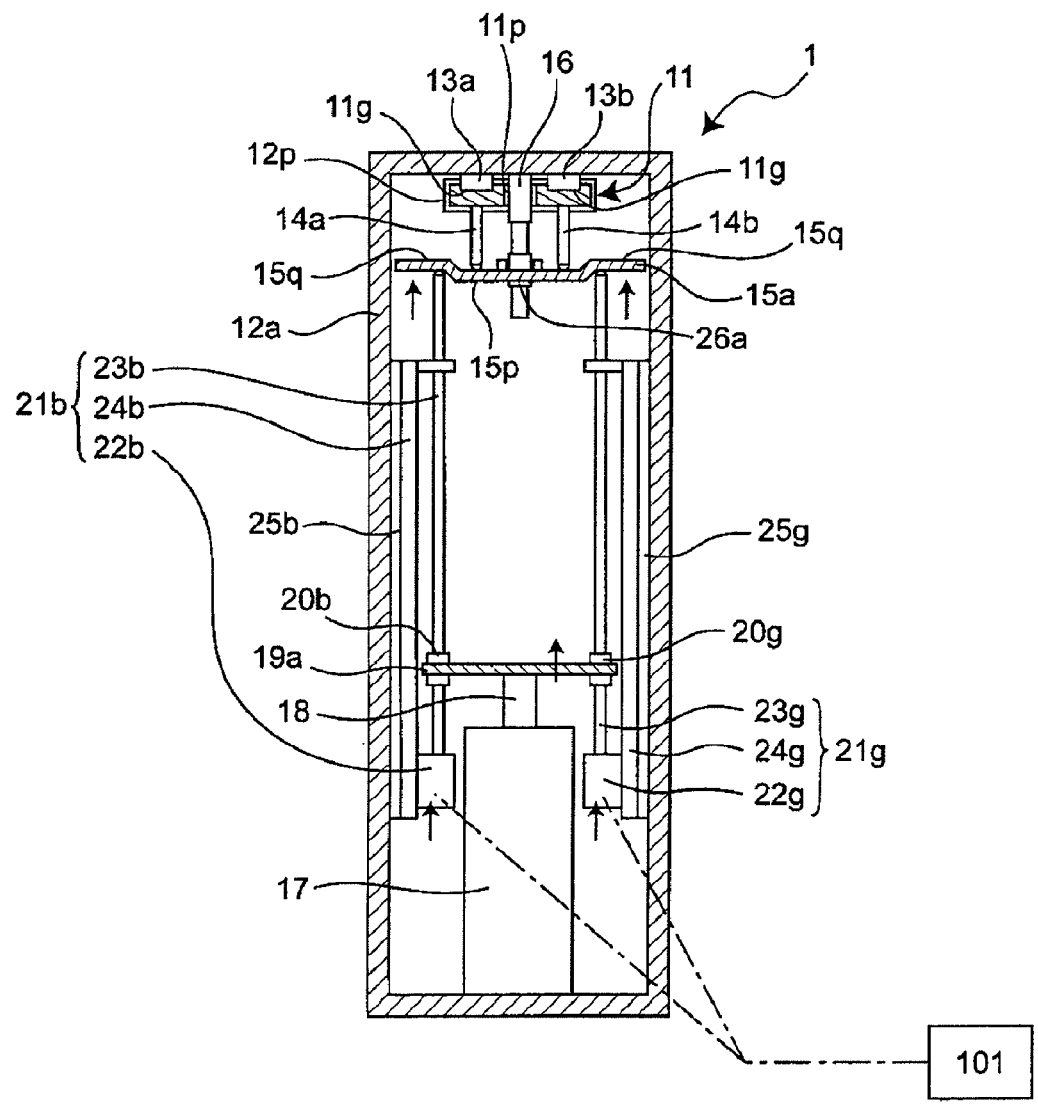
FIG. 1C is a cross-sectional view taken along line Y-Y of FIG. 1B, schematically showing the translation actuator in accordance with the first embodiment of the present invention.
Figure 1D:
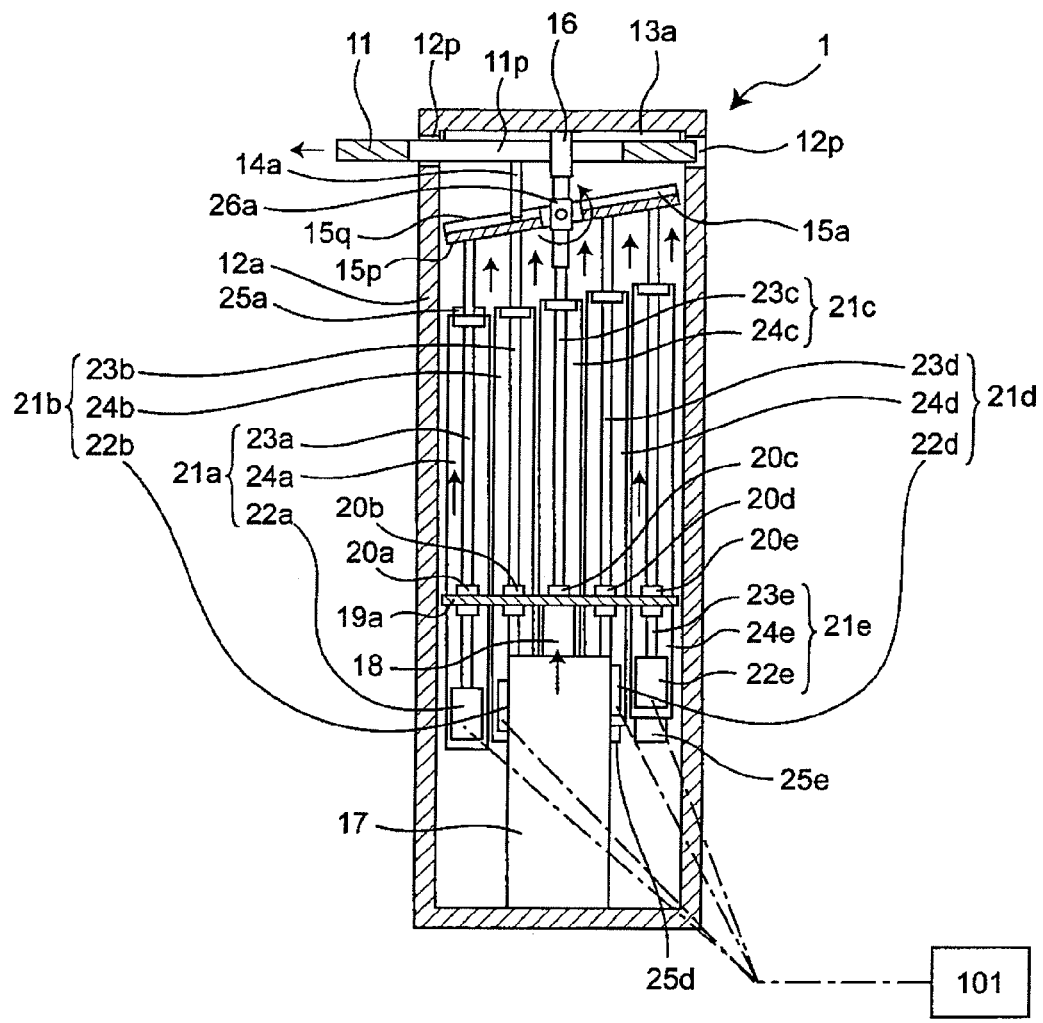
FIG. 1D is a cross-sectional view taken along line X-X of FIG. 1A, schematically showing the translation actuator at the time of driving in accordance with the first embodiment of the present invention.
Figure 1E:
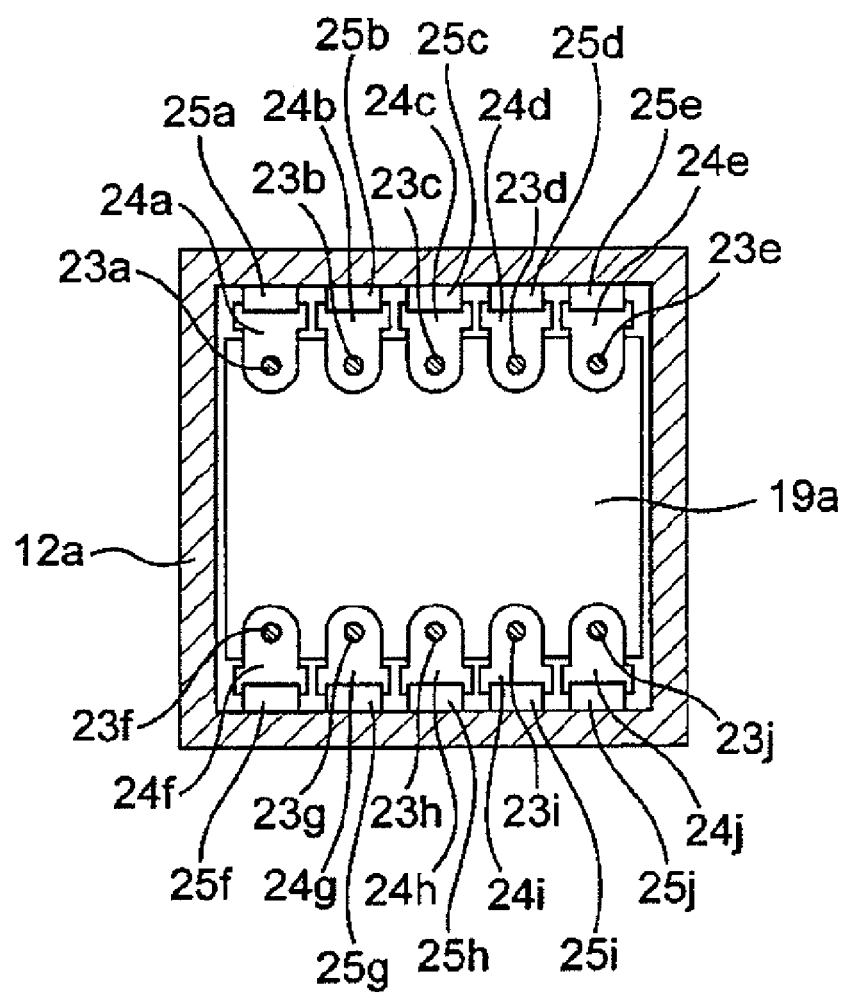
FIG. 1E is a cross-sectional view taken along line A-A of FIG. 1B, schematically showing the translation actuator in accordance with the first embodiment of the present invention.

FIG. 1A is a perspective view schematically showing a translation actuator 1 serving as one example of a flexible actuator in accordance with a first embodiment of the present invention, FIG. 1B is a cross-sectional view taken along line X-X of FIG. 1A, and FIG. 1C is a cross-sectional view taken along line Y-Y of FIG. 1B. Moreover, FIG. 1E is a cross-sectional view taken along line A-A of FIG. 1B. In FIGS. 1A to 1C, a frame 12a which has an elongated rectangular parallelepiped box shape along a vertical direction serves as one example of a base member. A pair of guide rails 13a and 13b in parallel with each other are secured to the inside of the upper face of the frame 12a in such a manner as to extend in a lateral direction orthogonal to the vertical direction. A plate-shaped translation member 11 is connected to the guide rails 13a and 13b in such a manner as to freely move reciprocally in a lateral direction in FIG. 1B (to freely move rightward and leftward). The linear guide rails 13a and 13b are fitted to a pair of guide grooves 11g in parallel with each other on the upper face of the translation member 11 in such a manner as to freely slide therein and are guided along the lateral direction so as to reciprocally move linearly. On the front and rear side faces on an upper portion of the frame 12a, a through hole 12p that allows the translation member 11 to freely come into and go out is formed. Moreover, on the lower face of the translation member 11, the upper ends of rod-shaped protrusions 14a and 14b that serve as an example of protruding members and are extended downward are secured at positions that are symmetrical with each other relative to the center in the width direction, and semi-spherical portions on the lower ends of the rod-shaped protrusions 14a and 14b are made in contact with the upper face of a transmission plate 15a having a quadrilateral plate shape (for example, a square), which serves as one example of the transmission member, so as to roll thereon. The transmission plate 15a has a structure in which a plate face is disposed in a direction orthogonal to the vertical direction, with its center portion 15p having recessed shapes with steps relative to the two end portions 15q in a width direction orthogonal to a moving direction of the translation member 11, so that the semi-spherical portions on the lower ends of the rod-shaped protrusions 14a and 14b are made in contact with the upper face of the center portion 15p so as to roll thereon. As will be described later, the upper face of the center portion 15p of the transmission plate 15a and the lower faces of the two end portions 15q are formed so as to be located on the same plane (substantially on the same plane). This transmission plate 15a also functions as one example of a swinging plate or a swinging member.

An elongated through hole 11p is formed at the center of the translation member 11 along the moving direction of the translation member 11 so that the movement of the translation member 11 is not intervened by a supporting rod 16, which will be described below.

The upper end of the supporting rod 16 is secured to the center of the inner face of the top face of the frame 12a, and the supporting rod 16 is disposed to extend downward from the top face of the frame 12a and passes through the through hole 11p at the center of the translation member 11. On an outer peripheral face of a middle portion of this supporting rod 16, an outer cylinder 26a is held so as to freely move only in the vertical direction in FIG. 1B. The transmission plate 15a is held on the outer cylinder 26a by a shaft so as to freely rotate around the axis perpendicular to the paper plane of FIG. 1B.

Meanwhile, a gas cylinder 17 serving as one example of an elastic mechanism is secured onto the bottom face of the frame 12a along the vertical direction. The gas cylinder 17 has a structure for storing a high-pressure gas therein and holds a ram-type piston 18 so as to move in the vertical direction in FIG. 1B. A force corresponding to a product of the cross-sectional area of the piston 18 and the pressure of the high-pressure gas (hereinafter, referred to as "generated force") is applied to the piston 18 in an upward direction in FIG. 1B. Moreover, to the tip of the piston 18 is connected a plate member 19a having a quadrilateral shape (for example, rectangular shape), which serves as one example of a displacement member capable of changing its position in a direction substantially perpendicular to the moving direction of the translation member 11, with its plate face being disposed in a direction orthogonal to the vertical direction. To the plate member 19a, ten ball screw nuts 20a to 20j are secured in two rows. More specifically, each of the groups of the ball screw nuts 20a to 20e and the ball screw nuts 20f to 20j forms one row with the same intervals provided in therebetween, and the rows are disposed at positions that are linearly symmetrical with each other relative to the center line of the plate member 19a. The ball screw nuts 20a to 20j are respectively coupled to ten ball screw mechanisms 21a to 21j, each serving as one example of a coupling mechanism. In FIG. 1B, only the ball screw nuts 20a to 20e and the ball screw mechanisms 21a to 21e are illustrated. In FIG. 1B, the ball screw nuts 20f to 20j and the ball screw mechanisms 21f to 21j are respectively represented as elements that are located at positions so as to face the ball screw nuts 20a to 20e and the ball screw mechanisms 21a to 21e. In addition, the ball screw mechanisms 21a to 21j are respectively configured by motors 22a to 22j, threaded shafts 23a to 23j disposed in the vertical direction, and holding members 24a to 24j disposed in the vertical direction. Moreover, the motors 22a to 22j are respectively secured to the holding members 24a to 24j, with the rotation shafts of the motors 22a to 22j being respectively coupled to the lower ends of the threaded shafts 23a to 23j. The threaded shafts 23a to 23j are respectively held by the holding members 24a to 24j through bearing portions or the like so as to freely rotate thereon. Moreover, the threaded shafts 23a to 23j are respectively threaded with the ball screw nuts 20a to 20j to penetrate therethrough. With this structure, when the rotation shafts of the motors 22a to 22j rotate forwardly or reversely, the threaded shafts 23a to 23j coupled to the rotation shafts of the motors 22a to 22j are respectively allowed to rotate forwardly or reversely. Then, the positions of the ball screw nuts 20a to 20j with which the threaded shafts 23a to 23j are threaded are respectively shifted reciprocatingly on the threaded shafts 23a to 23j along the axial direction of the threaded shafts 23a to 23j (in other words, in the downward direction). The semi-spherical portions of the upper ends of the threaded shafts 23a to 23j are made in contact with the lower faces of the two ends 15q of the transmission plate 15a so as to roll thereon.

A control computer 101 serving as one example of a control device is connected to each of the motors 22a to 22j. By controlling the drive of each of the motors 22a to 22j by the control computer 101, the relative position and the relative angle between the plate member 19a and the transmission plate 15a are changed.

Moreover, the holding members 24a to 24j are connected to guide rails 25a to 25j secured to the frame 12a in the vertical direction so as to freely move in the vertical direction in FIG. 1B. With this arrangement, each of the ball screw mechanisms 21a to 21j can be held with high rigidity, with respect to degrees of freedom except for the expanding and contracting directions thereof (in other words, directions in which the distance between the plate member 19a and the transmission plate 15a is adjustable (allowed to expand or contract) in the moving directions in the vertical direction of the ball screw nuts 20a to 20j).

In the following description, functions of this translation actuator 1 that are fulfilled under the control of the control computer 101 will be discussed.

Force to be exerted on the translation member 11 of the translation actuator 1 is determined by the generated force of the gas cylinder 17 and the amount of inclination of the transmission plate 15a. That is, when the force (generated force) generated by the gas cylinder 17 is exerted upward in FIG. 1B, the force is transmitted to the piston 18, the plate member 19a, the ball screw nuts 20a to 20j, the threaded shafts 23a to 23j of the ball screw mechanisms 21a to 21j, and the transmission plate 15a. As a result, the transmission plate 15a is pressed against the rod-shaped protrusions 14a and 14b. At this time, in the case where the transmission plate 15a is kept in the horizontal state (kept in a direction orthogonal to the vertical direction) as shown in FIG. 1B, the generated force of the gas cylinder 17 is transmitted to the frame 12a through the rod-shaped protrusions 14a and 14b, the translation member 11, the guide rails 13a and 13b, and the frame 12a, and is kept in a balanced state. On the other hand, in the case where the transmission plate 15a is in an inclined state from the horizontal state as shown in FIG. 1D (in FIG. 1D, an inclined state diagonally upward to the right, with the left edge of the transmission plate 15a being inclined downward while the right edge thereof being inclined upward), a force is exerted in a lateral direction (leftward in FIG. 1D) at each of the contact points between the transmission plate 15a and the rod-shaped protrusions 14a and 14b. The force exerted to the transmission plate 15a rightward is supported by the supporting rod 16; however, the force exerted to the translation member 11 leftward is outputted as it is. In the case of a statical state with losses due to sliding or the like being ignored, this leftward force is represented by a product of the generated force of the gas cylinder 17 and the tangent to an angular change of the transmission plate 15a from the horizontal state. Based upon this, by driving the motors 22a to 22j so as to set the transmission plate 15a to an inclination angle corresponding to a force to be desirably outputted by the control computer 101, the force control of the translation actuator 1 can be carried out.

Even upon disturbance within a high-frequency band that cannot be controlled by the control computer 101, since flexibility is maintained by the elasticity of the gas cylinder 17, the translation actuator 1 can be a flexible actuator that is safe against contact.

The generated force of the gas cylinder 17 is represented by a product of the cross-sectional area of the piston 18 and the pressure of the high-pressure gas, and although the pressure of the high-pressure gas changes depending on the amount of insertion of the piston 18 into the cylinder 17, the amount of the change can be reduced by making the inner diameter of the cylinder 17 larger than the diameter of the piston 18. That is, the gas cylinder in accordance with the first embodiment makes it possible to reduce a change in the generated force relative to the displacement of the piston 18. Moreover, another elastic mechanism, such as a single rod cylinder 18 in which a through hole is formed on the piston 18 so that a pressure difference between the pressure chambers on the two sides of the piston 18 is eliminated, that provides the same effects as those of the gas cylinder 17 of the first embodiment, is also desirably used because the change in the generated force relative to the displacement of the piston 18 can be reduced.

Moreover, in FIG. 1D, in the case where the translation actuator 1 is provided in such a state that the translation member 11 is moved leftward, the translation actuator 1 shall be carrying out a work to the outside of the flexible actuator. That is, in the case where the control computer 101 causes the motors 22a to 22j to stop from driving, as the translation member 11 is moved leftward, the holding members 24a to 24j are moved upward in FIG. 1D relative to the frame 12a along the guide rails 25a to 25j. Then, the plate member 19a is allowed to move upward in FIG. 1D through the ball screw nuts 20a to 20j coupled to the threaded shafts 23a to 23j of the ball screw mechanisms 21a to 21j supported by the holding members 24a to 24j. At this time, the translation actuator 1 carries out a work to the outside of the translation actuator 1 with potential energy that the gas cylinder 17 has lost.

In contrast, in the case where the translation actuator 1 is provided in such a state that the translation member 11 is moved rightward, the translation actuator 1 is in such a state as to be subjected to a work from the outside of the translation actuator 1. That is, in the case where the control computer 101 causes the motors 22a to 22j to stand still, as the translation member 11 is moved rightward, the holding members 24a to 24j are moved downward in FIG. 1D relative to the frame 12a along the guide rails 25a to 25j. Then, the plate member 19a is allowed to move downward in FIG. 1D through the ball screw nuts 20a to 20j coupled to the threaded shafts 23a to 23j of the ball screw mechanisms 21a to 21j supported by the holding members 24a to 24j. At this time, by the work carried out on the translation actuator 1 from the outside of the translation actuator 1, potential energy is stored in the gas cylinder 17.

In this manner, the translation actuator 1 not only carries out a work to the outside of the translation actuator 1 but also carries out a regeneration operation of accumulating energy in the translation actuator 1 by the work from the outside of the translation actuator 1. Therefore, in comparison with an actuator that is unable to carry out the regeneration operation, the translation actuator 1 of the first embodiment makes it possible to improve its operation efficiency.

Moreover, since the driving force of the translation actuator 1 is controlled by the amount of inclination of the transmission plate 15a, it becomes possible to obtain high output by releasing the potential energy in the gas cylinder 17 in a short period of time. To replenish potential energy in the gas cylinder 17, the ball screw mechanisms 21a to 21j may be operated by the control computer 101 so that the plate member 19a is pressed down. In the case where there is a great difference between a peak power required of the output of the translation actuator 1 and an average power thereof, since replenishment for the potential energy released for a short period of time may be carried out taking sufficient time, the power required for the motors 22a to 22j may be set to a low level in comparison with the peak power. Moreover, since the pressing-down operation of the plate member 19a is carried out by the ball screw mechanisms 21a to 21j under the control of the control computer 101 in cooperation with one another, it is possible to reduce the power required for each of the motors 22a to 22j.

Next, in the following description, the case where the driving force of the translation actuator 1 is changed will be discussed. In the first embodiment, ten ball screw mechanisms indicated by the reference numerals 21a to 21j are used as the ball screw mechanism. Since the transmission plate 15a is pressed against the rod-shaped protrusions 14a and 14b having fixed lengths, the transmission plate 15a is moved with two degrees of freedom, that is, the vertical position and the angle, relative to the supporting rod 16. For this reason, the minimum number of the ball screw mechanisms required is two. However, as shown in FIG. 1C, in the case where the threaded shafts 23b and 23g are located at the same positions as those of the rod-shaped protrusions 14a and 14b, that is, at positions rightward and leftward from the supporting rod 16, the generated force of the gas cylinder 17 can be supported by the ball screw mechanisms 21b and 21g having the threaded shafts 23b and 23g. For this reason, with the other ball screw mechanisms being not influenced by the generated force of the gas cylinder 17, the angle of the transmission plate 15a can be changed only by the ball screw mechanisms 21b and 21g, so that it is possible to change the driving force of the translation actuator 1 easily.

Moreover, in the case where only the angle of the transmission plate 15a is changed, since no positional changes are required for the ball screw mechanisms 21b and 21g, it is only necessary to hold the transmission plate 15a. To dispose the ball screw mechanisms in such a redundant manner is desirable because the above state is obtained at more points.

In the first embodiment, the transmission plate 15a is formed into a shape with steps, with its center portion 15p having recessed shapes relative to the two end portions 15q, and the face (upper face of the center portion 15p) with which the rod-shaped protrusions 14a and 14b are made in contact and the face (lower face of the two end portions 15q) with which the threaded shafts 23a to 23j are made in contact are designed to be located on the same plane (substantially on the same plane). In contrast, in the case of a transmission plate without a step, for example, when the amount of inclination of the transmission plate 15a is changed from the state shown in FIG. 1B, the distances in the vertical direction between the contact points of the transmission plate 15a with the rod-shaped protrusions 14a and 14b and the contact points of the transmission plate 15a with the threaded shafts 23b and 23g are changed affected by the thickness of the transmission plate. For this reason, it becomes necessary to lower the plate member 19a accordingly, with the result that in order to change the amount of inclination, additional energy corresponding to the increase in potential energy is required. Therefore, the transmission plate 15a is formed into the shape with steps as shown in the first embodiment with the contact points of the transmission plate 15a with the rod-shaped protrusions 14a and 14b and the contact points of the transmission plate 15a with the threaded shafts 23b and 23g being located on the same plane (substantially on the same plane), which is desirable because this structure can eliminate influences of the thickness of the transmission plate 15a.

In the first embodiment, the ball screw mechanisms 21a to 21j are used as one example of the coupling mechanism; however, the structure of the coupling mechanism is not limited thereto, and any combination of conventional techniques may be used as long as the same functions are achieved.

Figure 4:
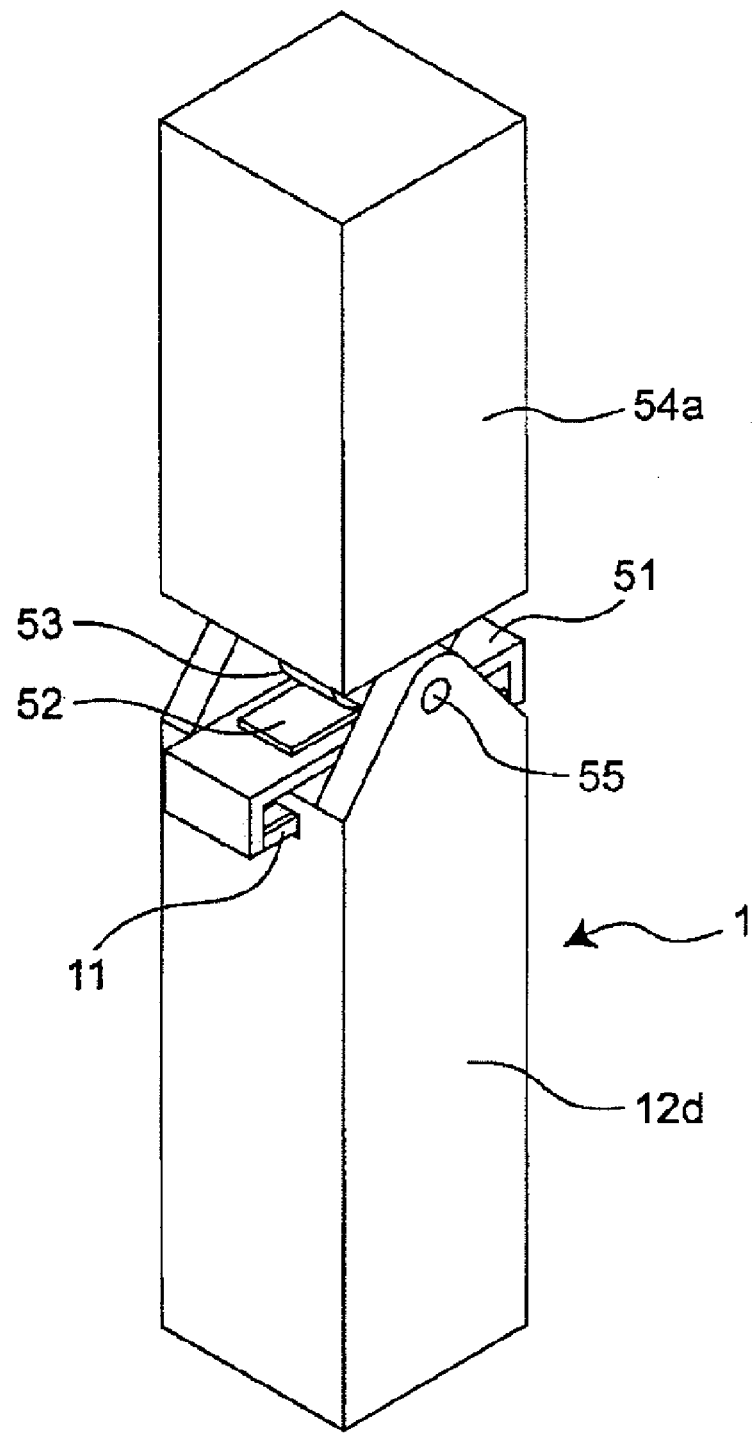
FIG. 4 is a perspective view schematically showing a joint-driving unit that uses the translation actuator in accordance with the first embodiment of the present invention.

Moreover, FIG. 4 shows a structural example of the joint-driving unit in which the translation actuator 1 of the first embodiment is used. An output transmitting member 51 having a C-shaped side face is coupled to the translation member 11 of the translation actuator 1, and a rack 52 is secured onto the output transmitting member 51. Meanwhile, a pinion 53 is secured to the lower end of an arm 54a disposed above a frame 12d and is engaged with the rack 52. Moreover, the lower end of the arm 54a and the upper end of the frame 12d are coupled to each other through a shaft 55 so as to freely rotate thereon.

Figure 5A:
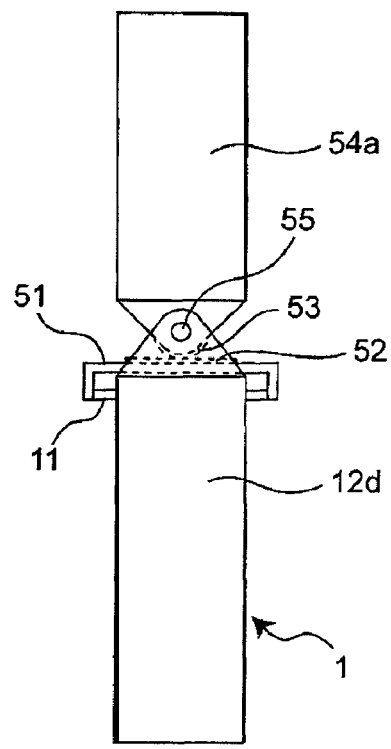
FIG. 5A is a front view schematically showing the joint-driving unit that uses the translation actuator in accordance with the first embodiment of the present invention.
Figure 5B:
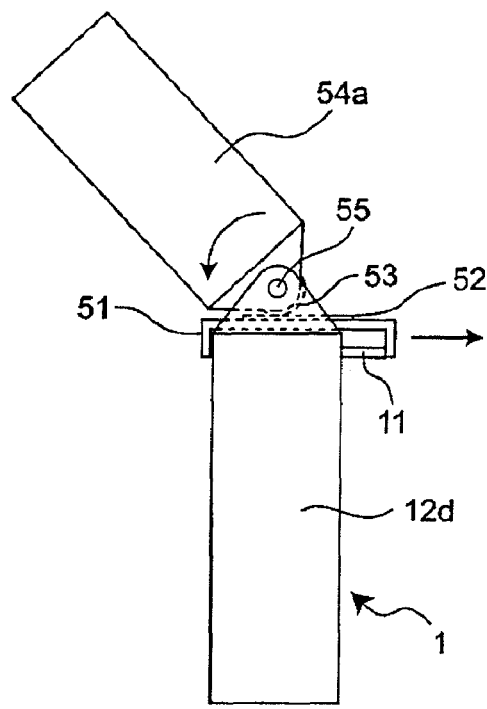
FIG. 5B is a front view schematically showing the joint-driving unit that uses the translation actuator in accordance with the first embodiment of the present invention.

With this arrangement, when the translation actuator 1 is operated from the state shown in FIG. 5A so that the translation member 11 is moved rightward, the arm 54a is allowed to rotate clockwise around the shaft 55 relative to the frame 12d through the rack 52 and the pinion 53, to be brought into a state shown in FIG. 5B. In the same manner, when the translation member 11 is moved leftward, the arm 54a is also allowed to rotate in a reverse direction relative to the frame 12d (that is, counterclockwise around the shaft 55).

By using this structure, it is thus possible to obtain a joint-driving unit that has the features of the translation actuator 1 of being superior in operational efficiency in addition to being flexible, and also to achieve a joint-driving unit for a robot arm that is particularly suitable for domestic applications.

The method for constructing the joint-driving unit is not limited to one using a rack-and-pinion mechanism, and any combination of conventional techniques may be used as long as the same functions are achieved.

SECOND EMBODIMENT

Figure 2A:
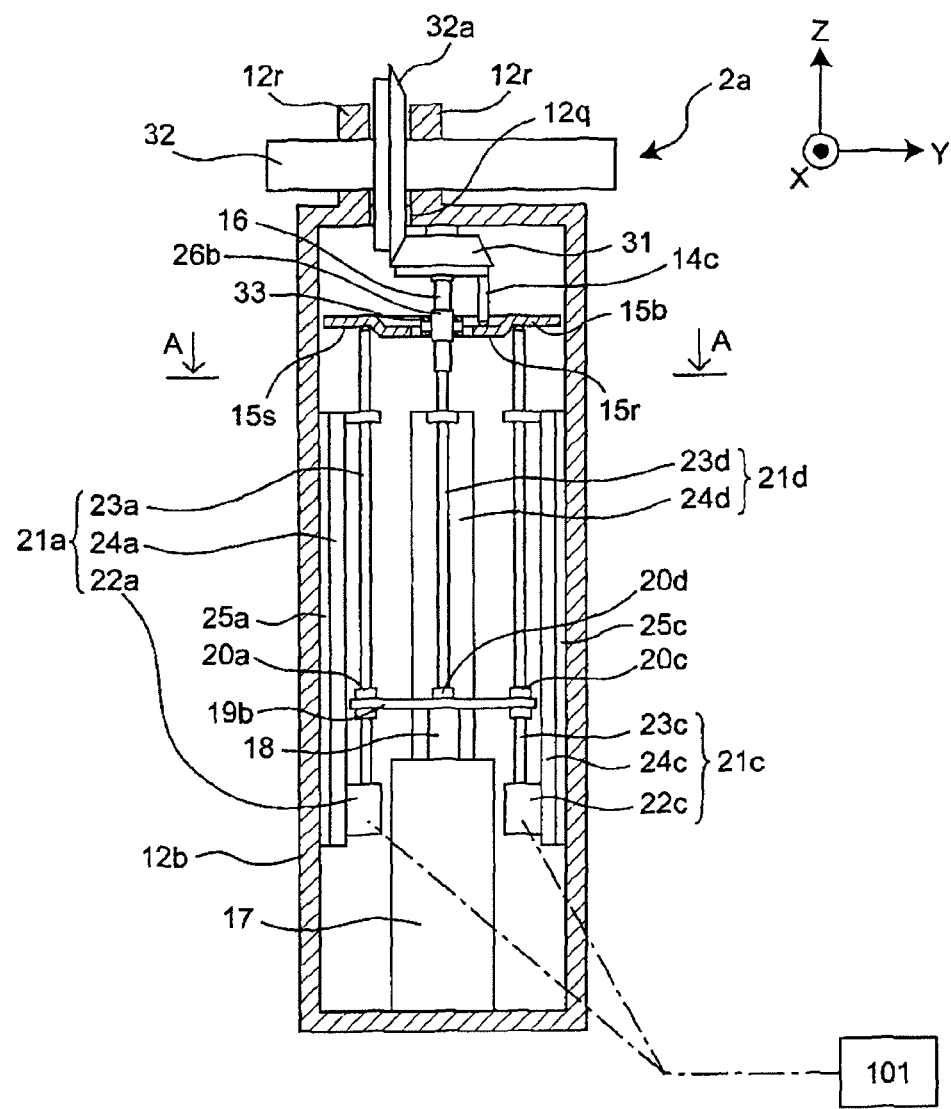
FIG. 2A is a cross-sectional view schematically showing a rotating actuator in accordance with a second embodiment of the present invention.
Figure 2B:
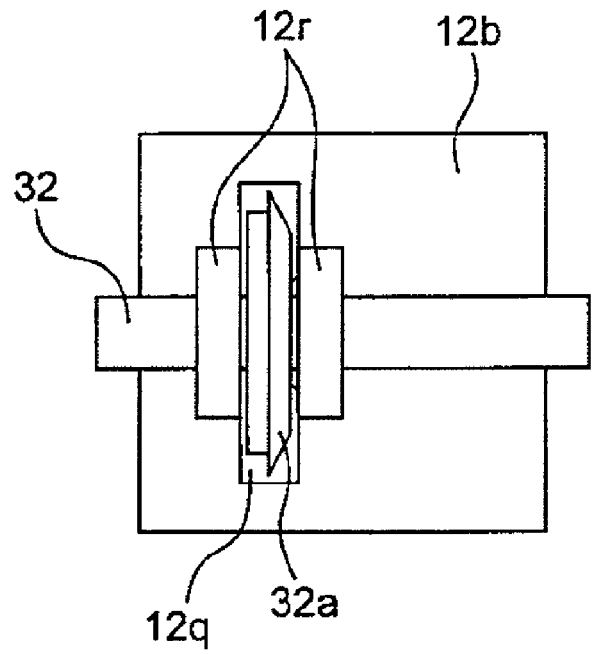
FIG. 2B is a top view schematically showing the rotating actuator in accordance with the second embodiment of the present invention.
Figure 2C:
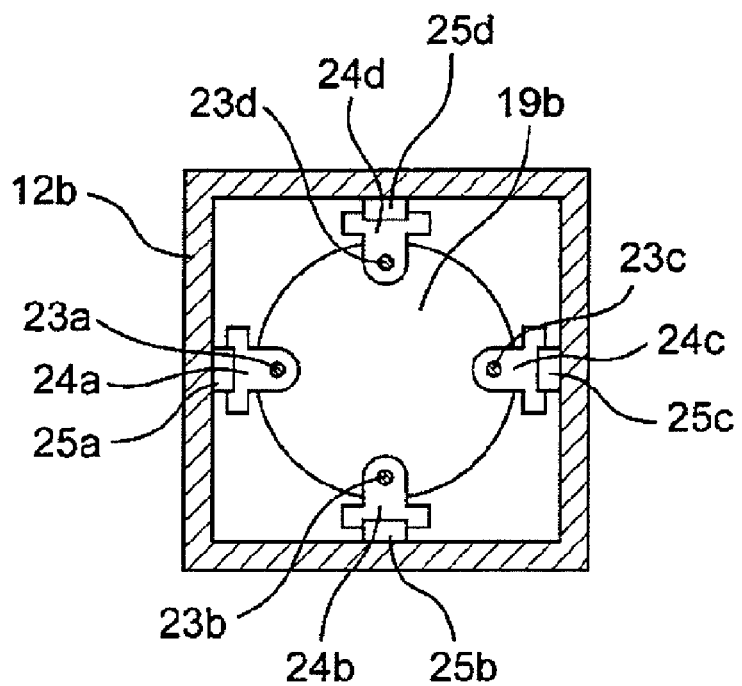
FIG. 2C is a cross-sectional view taken along line A-A of FIG. 2A, schematically showing the rotating actuator in accordance with the second embodiment of the present invention.
Figure 2D:
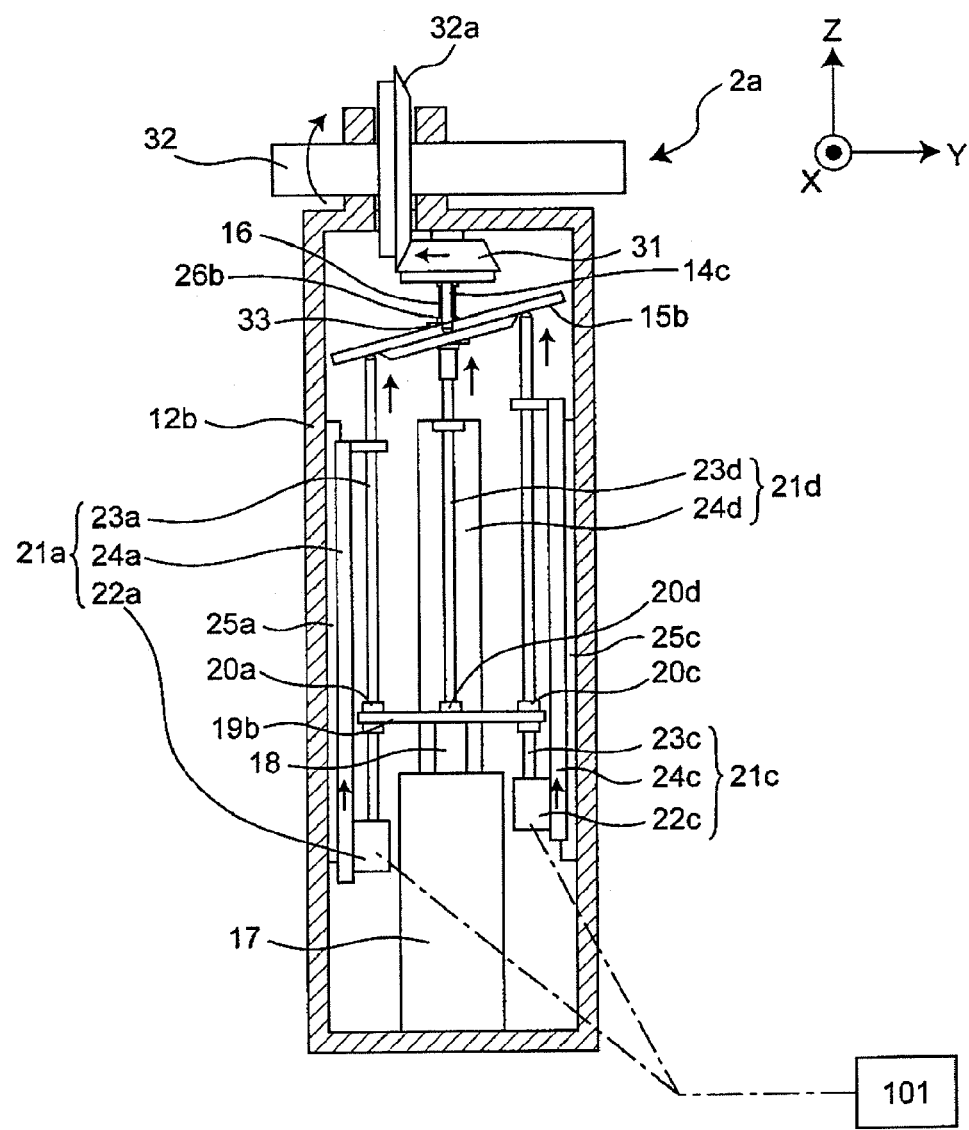
FIG. 2D is a cross-sectional view schematically showing the rotating actuator at the time of driving in accordance with the second embodiment of the present invention.

FIG. 2A is a cross-sectional view schematically showing a rotating actuator 2a serving as one example of a flexible actuator in accordance with a second embodiment of the present invention. FIG. 2B is a top view of the rotating actuator 2a, and FIG. 2C is a cross-sectional view taken along line A-A of FIG. 2A. FIG. 2F is an enlarged view showing the vicinity of a transmission plate 15b of FIG. 2A. The portions having the same functions as those of the above-described first embodiment are indicated by the same reference numerals, and overlapping description is not given. In the flexible actuator of the second embodiment, the Z-axis in the coordinate axes is defined as upward in the vertical direction. The X-axis is defined as a direction that is orthogonal to the Z-axis and penetrates one of side faces of a rectangular parallelepiped box-shaped frame 12b in the thickness direction, the frame 12b serving as one example of a base member. The Y-axis is defined as a direction that is orthogonal to the Z-axis and X-axis and penetrates a side face that is orthogonally adjacent to the side face of the rectangular parallelepiped box-shaped frame 12b.

In the second embodiment, the disc-shaped transmission plate 15b serving as one example of a transmission member is used to output a rotating movement, where the transmission plate 15b corresponding to the transmission plate 15a of the first embodiment. The transmission plate 15b is held on a ring-shaped member 33 provided with a shaft portion protruding in the X-axis direction so as to freely rotate around the X-axis by a bearing or the like. At the same time, the ring-shaped member 33 is held by a supporting rod 16 serving as a spline shaft secured downward to the center of the inner face of the upper face of the frame 12a, so as to move freely reciprocatingly only in the Z-axis direction (axial direction of the supporting rod 16), and is also held by an outer cylinder 26b provided with a shaft portion protruding in the Y-axis direction, so as to rotate freely around the Y-axis, through a bearing or the like. Moreover, a bevel gear 31 serving as one example of a rotating member is held by the supporting rod 16 so as to freely rotate around the Z-axis through a bearing or the like. A rod-shaped protrusion 14c serving as one example of a protruding member is provided on the lower face of the bevel gear 31 at a position apart from the rotation center in such a manner as to extend downward therefrom, so that its semi-spherical portion on the lower end is made in contact with the upper face of a round center portion 15r of the transmission plate 15b so as to roll thereon. Moreover, semi-spherical portions on the upper ends of the threaded shafts 23a to 23j are made in contact with the lower face of an annular outer peripheral portion 15s around the round center portion 15r of the transmission plate 15b so as to roll thereon. For the same reasons as those of the aforementioned first embodiment, the upper face of the round center portion 15r of the transmission plate 15b and the lower face of the annular outer peripheral portion 15s are formed so as to be located on the same plane (substantially on the same plane).

Note that the transmission plate 15b also functions as one example of a swinging plate or a swinging member.

The rotating output of the bevel gear 31 is taken out of the rotating actuator 2a as a forward/reverse rotating output around the Y-axis, through a rotation shaft (rotation shaft to which the bevel gear 31 is secured) 32 with the bevel gear which is held on a pair of bearing portions 12r formed on an opening portion 12q of the upper face of the frame 12b serving as one example of the base member, through a bearing portion or the like so as to freely rotate thereon. A bevel gear 32a of the rotation shaft 32 with the bevel gear is secured to the rotation shaft 32 and meshed with the bevel gear 31, so that the bevel gear 32a is rotated forwardly/reversely together with the rotation shaft 32, by the forward/reverse rotation of the bevel gear 31.

In the following description, functions of this rotating actuator 2a fulfilled under the control of the control computer 101 will be discussed.

Force to be exerted on the bevel gear 31 of the rotating actuator 2a is determined by the magnitude of the generated force of the gas cylinder 17 and the amount of inclination of the transmission plate 15b. That is, when the force generated by the gas cylinder 17 (generated force) is exerted upward in FIG. 2A, the force (generated force) is transmitted to the piston 18, a disc-shaped plate member 19b, the ball screw nuts 20a to 20d secured to positions that are rotation-symmetrical with one another relative to the center of the plate member 19b (more specifically, at positions at every 90 degrees on the same circumference around the center of the plate member 19b), the threaded shafts 23a to 23d of the ball screw mechanisms 21a to 21d disposed in association with the ball screw nuts 20a to 20d, and the transmission plate 15b, so as to press the transmission plate 15b against the rod-shaped protrusion 14c. At this time, in the case where the transmission plate 15b is kept in the horizontal state as shown in FIG. 2A, the generated force of the gas cylinder 17 is transmitted to the frame 12b through the rod-shaped protrusion 14c, the bevel gear 31, and the supporting rod 16, and is kept in a balanced state. On the other hand, in the case where the transmission plate 15b is in an inclined state from the horizontal state as shown in FIG. 2D (for example, an inclined state diagonally downward to the left), upon transmission of force from the transmission plate 15b to the rod-shaped protrusion 14c, a force in a circumferential direction is exerted at the contact point between the transmission plate 15b and the rod-shaped protrusion 14c, that is, a torque is exerted clockwise around the Z-axis onto the bevel gear 31. A torque that is exerted counterclockwise around the Z-axis on the transmission plate 15b as a reaction can be supported by the supporting rod 16. Moreover, in the case of an inclined state in a direction reverse to that of FIG. 2D (inclined state diagonally downward to the right), a torque is exerted counterclockwise around the Z-axis on the bevel gear 31, with a torque that is exerted clockwise around the Z-axis on the transmission plate 15b as a reaction being supported by the supporting rod 16. In the case of a statical state with losses due to sliding and the like being ignored, the torque exerted clockwise on the bevel gear 31 in FIG. 2D is represented by a product of the generated force of the gas cylinder 17 and the tangent to an angular change of the transmission plate 15b from the horizontal state to the inclined state. However, the angular change mentioned here refers to the angular change around the perpendicular from the contact point between the transmission plate 15b and the rod-shaped protrusion 14c to the rotation shaft of the bevel gear 31. Based upon this, by driving the motors 22a to 22d so as to set the transmission plate 15b by the amount of inclination (an inclination angle) corresponding to the magnitude of a force to be desirably outputted by the control computer 101, the force control of the rotating actuator 2a can be carried out.

Even upon disturbance within a high-frequency band that cannot be controlled by the control computer 101, since the flexibility is maintained by the elasticity of the gas cylinder 17, the rotating actuator 2a can be a flexible actuator that is safe against contact.

In the case where, in FIG. 2D, the rotating actuator 2a is in such a state as to allow the bevel gear 31 to rotate clockwise around the Z-axis, the rotating actuator 2a shall be carrying out a work to the outside of the rotating actuator 2a. That is, in the case where the control computer 101 causes the motors 22a to 22d to stop from driving, as the bevel gear 31 is rotated clockwise around the Z-axis, the plate member 19b is moved upward in FIG. 2D. At this time, the rotating actuator 2a carries out a work to the outside of the rotating actuator 2a with the potential energy that the gas cylinder 17 has lost.

In contrast, in the case where the rotating actuator 2a is in such a state that the bevel gear 31 is rotated counterclockwise around the Z-axis, the rotating actuator 2a is subjected to a work from the outside of the rotating actuator 2a. That is, in the case where the control computer 101 causes the motors 22a to 22d to stand still, as the bevel gear 31 is rotated counterclockwise around the Z-axis, the plate member 19b is moved downward in FIG. 2D, so that, by the work done on the rotating actuator 2a from the outside of the rotating actuator 2a, potential energy is stored in the gas cylinder 17.

In this manner, the rotating actuator 2a not only carries out a work to the outside of the rotating actuator 2a but also carries out a regeneration operation of accumulating energy in the rotating actuator 2a by the work from the outside of the rotating actuator 2a. Therefore, in comparison with an actuator that is unable to carry out a regeneration operation, the rotating actuator 2a of the second embodiment makes it possible to improve its operation efficiency.

Moreover, since the driving force of the rotating actuator 2a is controlled by the amount of inclination of the transmission plate 15b, it becomes possible to obtain high output by releasing the potential energy in the gas cylinder 17 in a short period of time. To replenish potential energy in the gas cylinder 17, the ball screw mechanisms 21a to 21d may be operated by the control computer 101 so that the plate member 19b is pressed down. In the case where there is a great difference between the peak power required of the output of the rotating actuator 2a and the average power thereof, since replenishment for the potential energy released for a short period of time may be carried out by taking sufficient time, the power required for the motors 22a to 22d may be at a low level in comparison with the peak power. Moreover, since the pressing-down operation of the plate member 19b is carried out by the ball screw mechanisms 21a to 21d under the control of the control computer 101 in cooperation with one another, it is possible to reduce the power required for each of the motors 22a to 22d.

In the following description, the case where the driving torque of the rotating actuator 2a is changed will be discussed. In the second embodiment, four ball screw mechanisms indicated by the reference numerals 21a to 21d are used as the ball screw mechanism. Since the transmission plate 15b is pressed against the rod-shaped protrusions 14c having a fixed length, the transmission plate 15b is moved with three degrees of freedom, that is, the displacement in the Z-axis direction, the rotation around the X-axis, and the rotation around the Y-axis, relative to the supporting rod 16. For this reason, the minimum number of the ball screw mechanisms required is three. However, as shown in FIG. 2D, in the case where the threaded shafts 23b and 23d are located at positions in the same Y direction as that of the rod-shaped protrusion 14c, the generated force of the gas cylinder 17 can be supported by the ball screw mechanisms 21b and 21d. For this reason, with the ball screw mechanisms 21a and 21c being not influenced by the generated force of the gas cylinder 17, the angle of the transmission plate 15b can be changed around the X-axis only by the ball screw mechanisms 21b and 21d, so that it is possible to change the driving torque of the rotating actuator 2a easily. In addition, in the case where only the angle of the transmission plate 15b is changed, no positional changes are required with the ball screw mechanisms 21b and 21d. Therefore, it is only necessary to hold the transmission plate 15b. To dispose the ball screw mechanisms circumferentially in such a redundant manner is desirable because the above state is obtained at more points. Moreover, to dispose the ball screw mechanisms circumferentially at equal intervals makes it possible to distribute the above states periodically without causing deviations due to the rotation angle of the bevel gear 31. For this reason, the target expansion or contraction of each of the ball screw mechanisms (in other words, the adjusting amount of the distance between the plate member 19a and the transmission plate 15a in the moving direction of the ball screw nuts 20a to 20j in the vertical direction) can be easily calculated, and it is thus possible to eliminate a load to be applied to a specific ball screw mechanism and consequently to desirably improve the controllability of the entire device.

Moreover, in the second embodiment, as shown in FIG. 2F in an enlarged manner, the transmission plate 15b is formed into a shape with steps with its center portion 15r having a recessed shape relative to its outer peripheral portion 15s, and the face (upper face of the center portion 15r) with which the rod-shaped protrusion 14c is made in contact and the face (lower face of the outer peripheral portion 15s) with which the threaded shafts 23a to 23d are made in contact are designed to be located on the same plane (substantially on the same plane). In contrast, in the case of a transmission plate without a step, for example, when the amount of inclination of the transmission plate 15b is changed from the state shown in FIG. 2A, the distance in the vertical direction between the contact point of the transmission plate 15b with the rod-shaped protrusion 14c and the contact points of the transmission plate 15b with the threaded shafts 23b and 23d is changed affected by the thickness of the transmission plate. For this reason, it becomes necessary to lower the plate member 19b accordingly, with the result that in order to change the amount of inclination, additional energy corresponding to the increase in potential energy is required. Therefore, the transmission plate 15b is formed into the shape with steps as shown in the second embodiment with the contact point of the transmission plate 15b with the rod-shaped protrusion 14c and the contact points of the transmission plate 15b with the threaded shafts 23b and 23d being located on the same plane (substantially on the same plane), which is desirable because this structure can eliminate influences from the thickness of the transmission plate 15b.

Figure 2E:
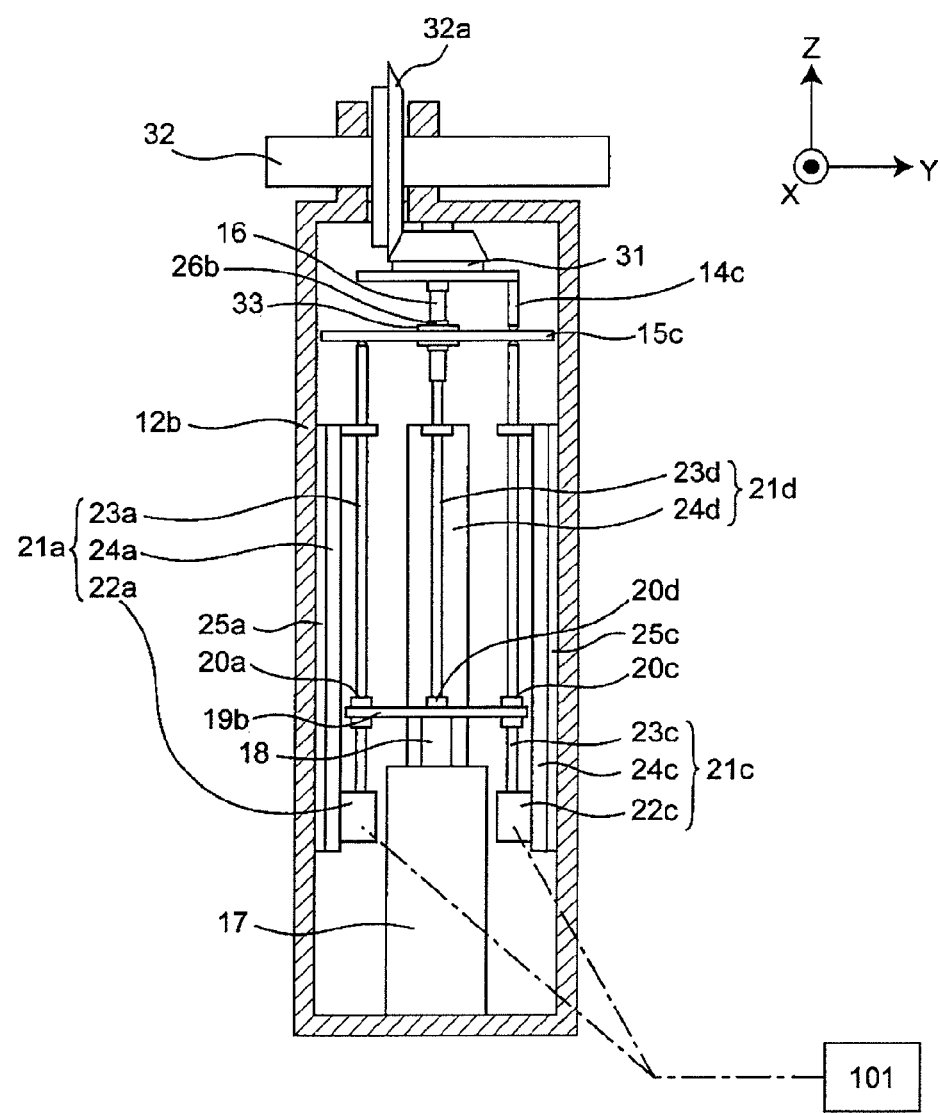
FIG. 2E is a cross-sectional view schematically showing a different structural example of a rotating actuator as a modification of the second embodiment of the present invention.
Figure 2F:
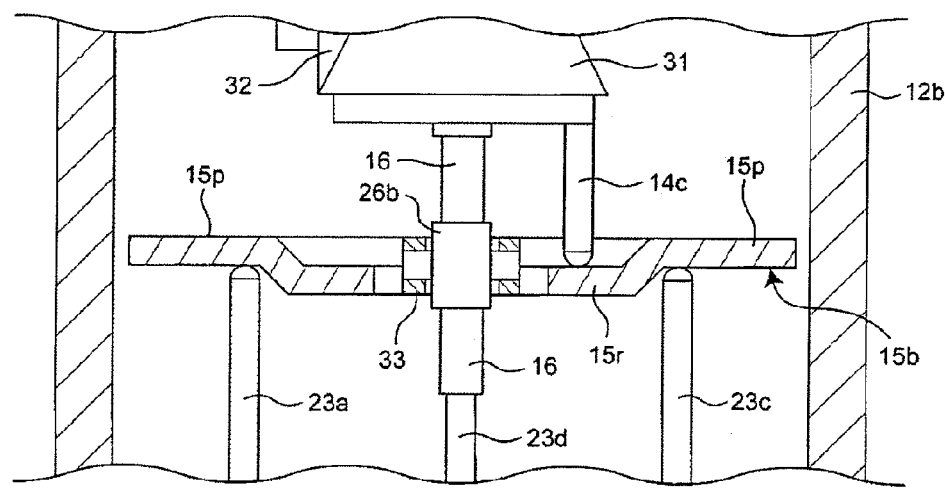
FIG. 2F is an enlarged view showing the vicinity of a transmission plate of FIG. 2A in the rotating actuator in accordance with the second embodiment of the present invention.

Meanwhile, as shown in FIG. 2E as a modification of the second embodiment of the present invention, the transmission plate 15b may be formed as a flat-plate transmission plate 15c without a step, and a circumference that can be taken by the contact point between the rod-shaped protrusion 14c and the transmission plate 15c and a circumference in which the contact points between the threaded shafts 23a to 23d and the transmission plate 15c are included may form the same circumference that is only reciprocatingly shifted in the Z-axis direction. That is, as shown in FIG. 2E, this structure is characterized in that the contact point between the rod-shaped protrusion 14c serving as one example of the protruding member and the transmission plate 15c serving as one example of the transmission member includes the contact point between the ball screw mechanism serving as one example of the coupling mechanism and the transmission plate 15c or the rotation center of the coupling portion thereof, and is located substantially on the same plane as the side face of an elliptic column having a height in the displacement direction of the plate member 19b serving as one example of the displacement member. With this structure, for example, in rotating the transmission plate 15c around the X-axis in FIG. 2E, the generated force of the gas cylinder 17 is supported by the ball screw mechanism 21c. For this reason, although there are influences caused by the thickness of the transmission plate 15c, the work to be done by the ball screw mechanism 21a can be reduced. The transmission plate 15c is also allowed to function as one example of a swinging plate or a swinging member.

In the second embodiment also, the ball screw mechanisms are used as the coupling mechanism; however, the structure of the coupling mechanism is not limited to this, and any combination of conventional techniques may be used as long as the same functions are achieved.

Figure 6:
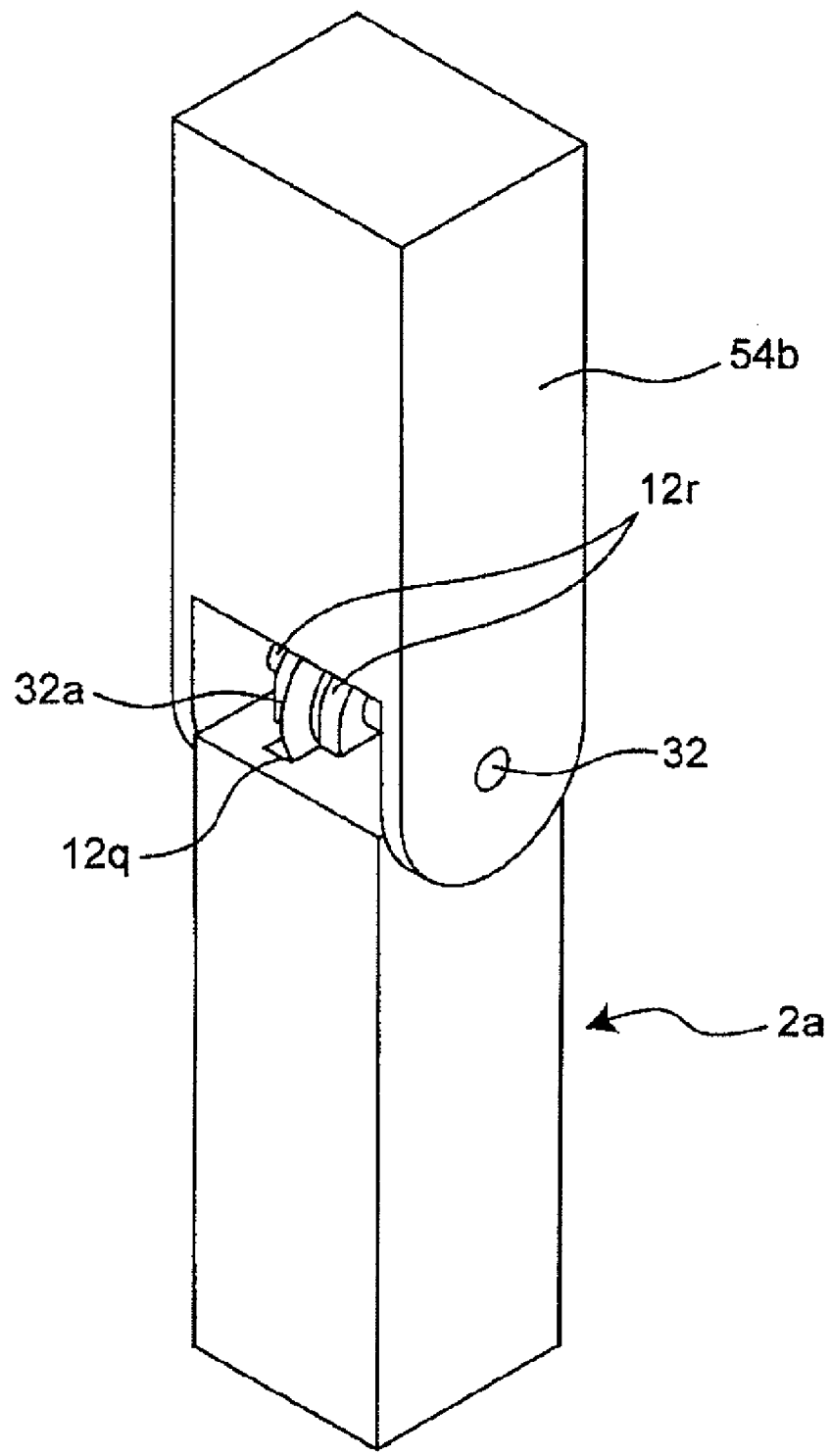
FIG. 6 is a perspective view schematically showing a joint-driving unit that uses the rotating actuator in accordance with the second embodiment of the present invention.

Moreover, FIG. 6 shows a structural example of a joint-driving unit in which the rotating actuator 2a of the second embodiment is used. An arm 54b is disposed above the rotating actuator 2a, and the arm 54b is directly secured to the rotation shaft 32 of the rotating actuator 2a.

Figure 7A:
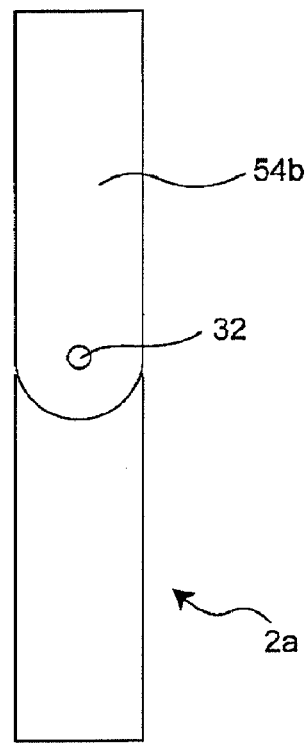
FIG. 7A is a side view schematically showing the joint-driving unit that uses the rotating actuator in accordance with the second embodiment of the present invention.
Figure 7B:
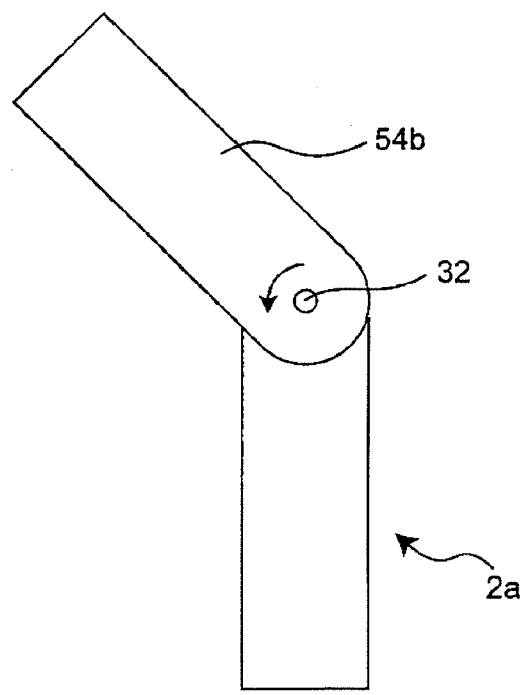
FIG. 7B is a side view schematically showing the joint-driving unit that uses the rotating actuator in accordance with the second embodiment of the present invention.

With this arrangement, when the rotating actuator 2a is operated from the state shown in FIG. 7A so that, by rotating the rotation shaft 32 counterclockwise, the arm 54b is caused to rotate counterclockwise to be in a state shown in FIG. 7B. In the same manner, by rotating the rotation shaft 32 clockwise, the arm 54b is also allowed to rotate in a reverse direction (that is, clockwise).

By using this structure, it is possible to obtain a joint-driving unit that has the features of the rotating actuator 2a of being superior in operational efficiency in addition to being flexible, and also to achieve a joint-driving unit for a robot arm that is particularly suitable for domestic applications.

THIRD EMBODIMENT

Figure 3A:
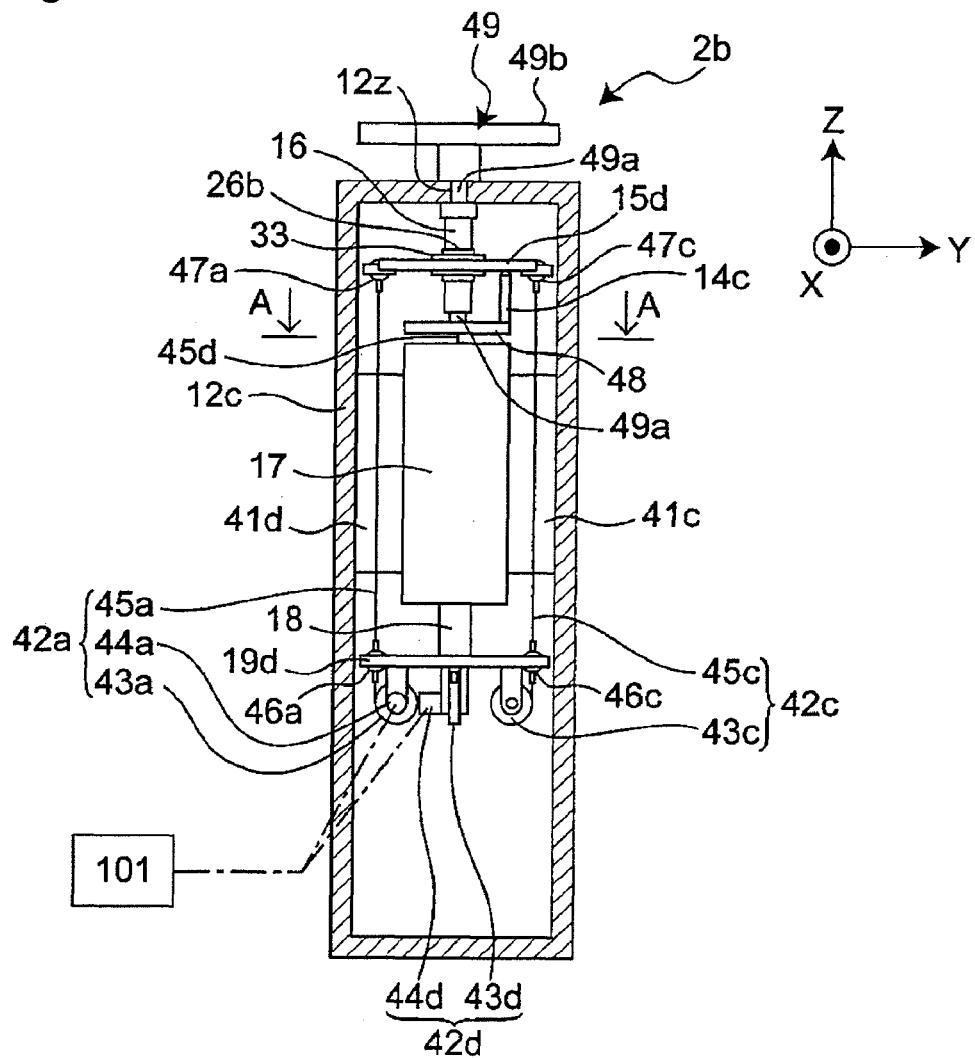
FIG. 3A is a cross-sectional view schematically showing a rotating actuator in accordance with a third embodiment of the present invention.
Figure 3B:
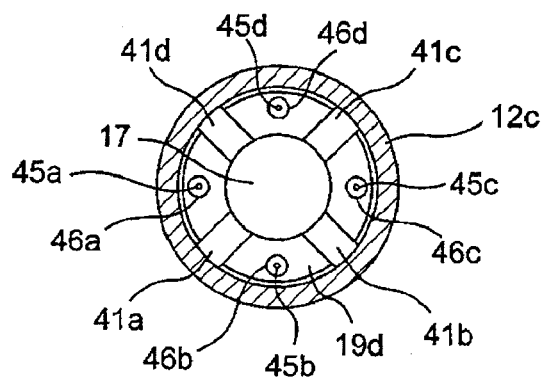
FIG. 3B is a cross-sectional view taken along line A-A of FIG. 3A, schematically showing the rotating actuator in accordance with the third embodiment of the present invention.

FIG. 3A is a cross-sectional view schematically showing a rotating actuator $2b$ serving as one example of a flexible actuator in accordance with a third embodiment of the present invention. Moreover, FIG. 3B is a cross-sectional view taken along line A-A of FIG. 3A. The portions having the same functions as those of the second embodiment are indicated by the same reference numerals, and overlapping description is not given. In the flexible actuator of the third embodiment also, the Z-axis in the coordinate axes is defined as upward in the vertical direction. The X-axis is defined as a direction that is orthogonal to the Z-axis and penetrates one of side faces of a rectangular parallelepiped box-shaped frame $12c$ in the thickness direction, the frame $12c$ serving as one example of a base member. Moreover, the Y-axis is defined as a direction that is orthogonal to the Z-axis and X-axis and penetrates a side face that is orthogonally adjacent to the side face of the rectangular parallelepiped box-shaped frame $12c$.

In the third embodiment, the generated force of the gas cylinder 17 is transmitted not by the pressing force, but by tensile force generated by four wire mechanisms $42a$ to $42d$ that serve as one example of the coupling mechanism. In FIG. 3A, the gas cylinder 17 is secured to a middle portion of the frame $12c$ by four supporting members $41a$ to $41d$ (for example, struts). Moreover, the generated force of the gas cylinder 17 is transmitted to a disc-shaped plate member $19d$ which is disposed below the gas cylinder 17 inside the frame $12c$ and to which the lower end of the piston 18 is secured. Four wire reels $43a$ to $43d$ are disposed on the plate member $19d$ so as to have intervals of 90 degrees around the center of the plate member $19d$, with the respective diameter directions being set in the X-axis or Y-axis direction. The four wire reels $43a$ to $43d$ are held by the plate member $19d$ through bearing portions or the like so as to freely rotate thereon, and the respective rotation angles of the wire reels $43a$ to $43d$ are changed by forward/reverse rotations of the rotation shafts of the motors $44a$ to $44d$ that are driven and controlled by the control computer 101. One ends of wires $45a$ to $45d$ are coupled to the wire reels $43a$ to $43d$, and the wires $45a$ to $45d$ are respectively allowed to penetrate lower-side spherical members $46a$ to $46d$ that are held on the plate member $19d$ by spherical bearings so as to freely swing thereon, with the other ends of the wires $45a$ to $45d$ being coupled to upper-side spherical members $47a$ to $47d$ that are held on the disc-shaped transmission plate $15d$ by spherical bearings. That is, when, upon instruction by the control computer 101, the rotation shafts of the motors $44a$ to $44d$ are rotated, each of the wire reels $43a$ to $43d$ is rotated simultaneously so that the lengths of the wires $45a$ to $45d$ (in other words, the lengths between the upper-side spherical members $47a$ to $47d$ and the lower-side spherical members $46a$ to $46d$, that is, the length between the transmission plate $15d$ and the plate member $19d$) are each changed. The transmission plate $15d$ is pressed against a spherical portion of the upper end of a rod-shaped protrusion $14c$, which will be described later, by the generated force of the gas cylinder 17 transmitted through the wires $45a$ to $45d$. Additionally, the transmission plate $15d$ is allowed to also function as one example of a swinging plate or a swinging member.

Meanwhile, the transmission plate $15d$ is held onto a ring-shaped member 33 provided with a shaft portion protruding in the X-axis direction by a bearing or the like, so as to rotate freely around the X-axis, and at the same time, the ring-shaped member 33 is held through a bearing or the like onto the outer cylinder $26b$ provided with a shaft portion protruding in the Y-axis direction so as to rotate freely around the Y-axis. Moreover, the outer cylinder $26b$ is held on the supporting rod 16 serving as a cylinder-shaped spline shaft secured downward to the center of the inner face of the upper face of the frame $12c$, so as to move reciprocatingly freely only in the Z-axis direction (axial direction of the supporting rod 16). Furthermore, a rotation shaft 49 is held onto the supporting rod 16, with the lower end of its rotation shaft portion $49a$ being secured onto a rotation disc 48 serving as one example of a rotating member, through a bearing portion or the like, so as to rotate freely thereon around the Z-axis in a state where the rotation shaft portion $49a$ penetrates a through hole $12z$ on a center portion of the cylinder-shaped supporting rod 16 and the upper face of the frame $12c$. The rotation output to be given to the rotation disc 48 by the rod-shaped protrusion $14c$ is taken out of the rotating actuator $2b$ as rotation output around the Z-axis through the rotation shaft portion $49a$ and the disc portion $49b$ secured to the upper end thereof. The rotation shaft portion $49a$ is formed into a small diameter portion by the through hole $12z$ of the frame $12c$, and a large diameter portion having a diameter larger than that of the small diameter portion is disposed outside the through hole $12z$. Therefore, when downward force is applied to the rotation shaft portion $49a$, the large diameter portion of the rotation shaft portion $49a$ is made in contact with the periphery of the through hole $12z$ of the frame $12c$ so that the force can be received by the frame $12c$.

In the following description, functions of this rotating actuator $2b$ that are fulfilled under the control of the control computer 101 will be discussed.

Figure 3C:
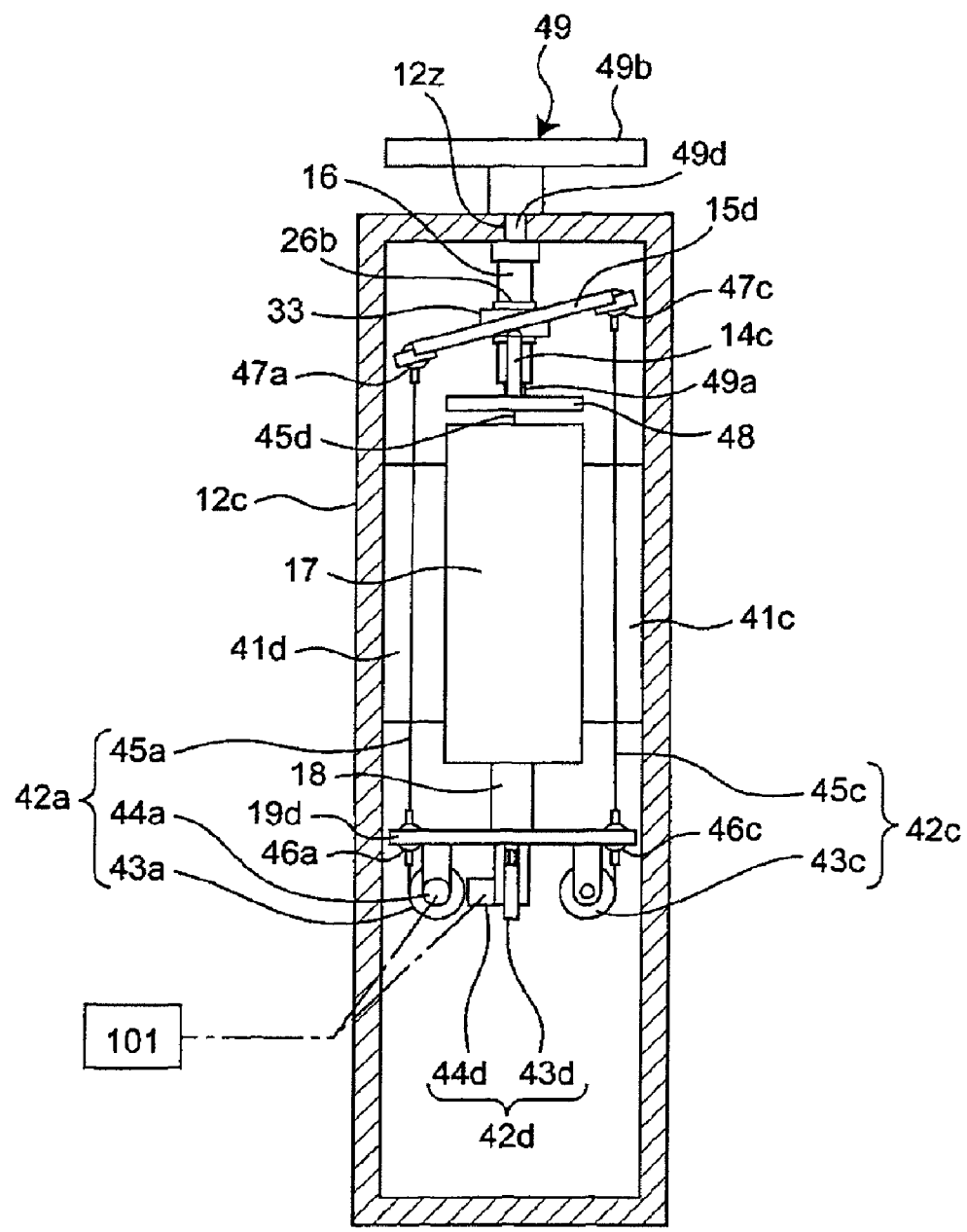
FIG. 3C is a cross-sectional view schematically showing the rotating actuator at the time of driving in accordance with the third embodiment of the present invention.

Force to be exerted on the rotation shaft 49 of the rotating actuator $2b$ is determined by the magnitude of generated force of the gas cylinder 17 and the amount of inclination of the transmission plate $15d$. That is, when the force (generated force) generated by the gas cylinder is exerted downward in FIG. 3A, the force (generated force) is transmitted to the piston 18, the plate member $19d$, the wire reels $43a$ to $43d$ secured to the positions that are rotation-symmetrical with one another relative to the center of the plate member $19d$ (more specifically, at positions spaced every 90 degrees on the same circumference around the center of the plate member $19d$), the wires $45a$ to $45d$, the upper-side spherical members $47a$ to $47d$, and the transmission plate $15d$, so that the transmission plate $15d$ is pressed against the rod-shaped protrusion $14c$. At this time, in the case where the transmission plate $15d$ is in the horizontal state as shown in FIG. 3A, the generated force of the gas cylinder 17 is transmitted to the frame $12c$ through the rod-shaped protrusion $14c$, the rotation disc 48, and the rotation shaft 49, and is kept in a balanced state. On the other hand, in the case where the transmission plate $15d$ is in an inclined state from the horizontal state as shown in FIG. 3C (for example, an inclined state diagonally downward to the left), upon transmission of force from the transmission plate $15d$ to the rod-shaped protrusion $14c$, a force in a circumferential direction, that is, a torque exerted to the rotation disc counterclockwise around the Z-axis, is applied to the contact point between the transmission plate $15d$ and the rod-shaped protrusion $14c$. The torque that is exerted clockwise around the Z-axis on the transmission plate $15d$ as a reaction is supported by the supporting rod 16. Moreover, in the case of an inclined state in a direction reverse to that of FIG. 3C (inclined state diagonally downward to the right), a torque that is exerted clockwise around the Z-axis on the rotation disc 48, with a torque that is exerted counterclockwise around the Z-axis on the transmission plate 15d as a reaction being supported by the supporting rod 16. In the case of a statical state with losses due to sliding and the like being ignored, this torque exerted clockwise is represented by a product of the generated force of the gas cylinder 17 and the tangent to an angular change of the transmission plate 15d from the horizontal state to the inclined state. However, the angular change mentioned here refers to the angular change around the perpendicular from the contact point between the transmission plate 15d and the rod-shaped protrusion 14c to the rotation shaft portion 49a of the rotation shaft 49. Based upon this, by driving the motors 44a to 44d so as to set the transmission plate 15d by the amount of inclination (an inclination angle) corresponding to the magnitude of a force to be desirably outputted by the control computer 101, the force control of the rotating actuator 2b can be carried out.

Even upon disturbance within a high-frequency band that cannot be controlled by the control computer 101, since the flexibility is maintained by the elasticity of the gas cylinder 17, the rotating actuator 2b can be a flexible actuator that is safe against contact. Moreover, in the same manner as in the second embodiment, when the rotating actuator 2b is subjected to a work from the outside thereof, energy regeneration is carried out on the gas cylinder 17.

In the following description, the case where the driving torque of the rotating actuator 2b is changed will be discussed. In the third embodiment, four wire mechanisms indicated by the reference numerals 42a to 42d are used as the wire mechanism; however, since the transmission plate 15d is pressed against the rod-shaped protrusion 14c having a fixed length, the transmission plate 15d is moved with three degrees of freedom, that is, the displacement in the Z-axis direction, the rotation around the X-axis, and the rotation around the Y-axis, relative to the supporting rod 16. For this reason, the minimum number of the wire mechanisms required is three. However, as shown in FIG. 3A, in the case where the wires 45a and 45c are located at positions in the same X direction as that of the rod-shaped protrusion 14c, the generated force of the gas cylinder 17 can be supported by the wire mechanisms 42a and 42c. For this reason, with the wire mechanisms 42b and 42d being not influenced by the generated force of the gas cylinder 17, the angle of the transmission plate 15d can be changed around the Y-axis only by the wire mechanisms 42a and 42c, so that it is possible to change the driving torque of the rotating actuator 2b easily. In the case where only the angle of the transmission plate 15d is changed, since no positional changes are required with the wire mechanisms 42a and 42c, it is only necessary to hold the transmission plate 15d. To dispose the wire mechanisms circumferentially in such a redundant manner is desirable because the above state is obtained at more points. Moreover, to dispose the wire mechanisms circumferentially at equal intervals makes it possible to distribute the above states periodically without causing deviations due to the rotation angle of the rotation shaft 49. For this reason, the target amount of expansion or contraction of each of the wire mechanisms (in other words, the adjusting amount of the distance between the plate member 19d and the transmission plate 15d in the moving direction of the wire mechanisms 42a to 42d in the vertical direction) can be easily calculated, and it is thus possible to eliminate a load to be applied to a specific wire mechanism and consequently to desirably improve the controllability of the entire device.

Moreover, in the third embodiment, the rotation center of the upper-side spherical members 47a to 47d (one example of the rotation center of the coupling portion) is arranged so as to be located on the same plane (substantially on the same plane) as the plane on which the transmission plate 15d and the rod-shaped protrusion 14c are made in contact. This structure is desirably used because it becomes possible to eliminate influences from the thickness of the transmission plate 15d.

In the third embodiment, the wire mechanisms are used as the coupling mechanism; however, the structure of the coupling mechanism is not limited thereto, and any combination of conventional techniques may be used as long as the same functions are achieved.

While the description has been given by exemplifying the gas cylinder 17 as the elastic mechanism, the present invention is not limited thereto, and a spring may be used as long as the same functions are achieved.

By properly combining the arbitrary embodiments of the aforementioned various embodiments, the effects possessed by the embodiments can be produced.

INDUSTRIAL APPLICABILITY

A flexible actuator and a joint-driving unit using the actuator in accordance with the present invention make it possible to carry out force control easily with superior operational efficiency, and is effectively used as an actuator or the like for driving joints of a robot and a joint-driving unit or the like using the actuator.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A flexible actuator capable of carrying out a translation operation, comprising:
   a base member;
   a translation member that is held on the base member so as to move reciprocatingly thereon linearly;
   a displacement member that is capable of being displaced in a direction substantially perpendicular to a moving direction of the translation member;
   an elastic mechanism that is secured to the base member, for accumulating and releasing elastic energy in accordance with a distance to the displacement member;
   a transmission member that is connected to the displacement member so as to allow the distance relative to the displacement member to be adjusted by two or more coupling mechanisms;
   a protruding member that is formed on the translation member in a protruding manner to be pressed against the transmission member by force generated by energy released from the elastic mechanism; and
   a control device for changing a relative position and a relative angle between the displacement member and the transmission member by controlling an adjusting operation of the distance relative to the coupling mechanisms.

2. The flexible actuator according to claim 1, wherein a contact point between the protruding member and the transmission member is located substantially on same plane as a plane including a contact point between the coupling mechanisms and the transmission member or a rotation center of a coupling portion therebetween.

3. The flexible actuator according to claim 1, wherein the elastic mechanism is a ram cylinder or a single rod cylinder that allows a fluid to move between pressure chambers on two sides of a piston.

4. The flexible actuator according to claim 1, wherein the coupling mechanisms have a structure with which the distance between the displacement member and the transmission member is adjustable substantially in parallel with a displacement direction of the displacement member and which is pressed against the transmission member by generated force of the elastic mechanism.

5. The flexible actuator according to claim 1, wherein the coupling mechanisms are coupled to the displacement member and the transmission member respectively so as to rotate freely thereon, is variably adjustable a distance between both connecting points thereof.

6. A joint-driving unit driven by the flexible actuator of claim 1.

7. A flexible actuator capable of carrying out a swinging operation and a rotating operation, comprising:
- a base member;
- a rotating member that is held on the base member so as to rotate freely thereon;
- a displacement member that is capable of being displaced in a direction that is substantially same as a rotation shaft direction of the rotating member;
- an elastic mechanism that is secured to the base member, for accumulating and releasing elastic energy in accordance with a distance to the displacement member;
- a transmission member that is connected to the displacement member so as to allow the distance relative to the displacement member to be adjusted by three or more coupling mechanisms;
- a protruding member that is provided on the rotating member at a position off a rotation center of the rotating member in a protruding manner to be pressed against the transmission member by force generated by energy released from the elastic mechanism;
- a control device for changing a relative position and a relative angle between the displacement member and the transmission member by controlling an adjusting operation of the distance relative to the coupling mechanisms; and
- wherein the coupling mechanisms are coupled to the displacement member and the transmission member respectively so as to rotate freely thereon, is variably adjustable a distance between both connecting points thereof.

* * * * *